US012652141B2

(12) United States Patent
Liu et al.

(10) Patent No.: US 12,652,141 B2
(45) Date of Patent: Jun. 9, 2026

(54) METHOD AND DEVICE IN COMMUNICATION NODES FOR A MULTICARRIER TRANSMISSION IN WIRELESS COMMUNICATIONS

(71) Applicant: Apogee 5G Global, LLC, Plano, TX (US)

(72) Inventors: Zheng Liu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 596 days.

(21) Appl. No.: 17/813,935

(22) Filed: Jul. 21, 2022

(65) Prior Publication Data

US 2022/0368500 A1 Nov. 17, 2022

Related U.S. Application Data

(63) Continuation of application No. PCT/CN2021/075167, filed on Feb. 4, 2021.

(30) Foreign Application Priority Data

Feb. 8, 2020 (CN) .......................... 202010083178.2

(51) Int. Cl.
*H04L 5/00* (2006.01)
*H04W 72/044* (2023.01)

(52) U.S. Cl.
CPC ......... *H04L 5/0053* (2013.01); *H04W 72/044* (2013.01); *H04L 5/0007* (2013.01)

(58) Field of Classification Search
CPC ..... H04L 5/0007; H04L 5/001; H04L 5/0053; H04L 5/0078; H04L 5/0094; H04W 16/14; H04W 72/044; H04W 72/0453; H04W 72/0457
See application file for complete search history.

(56) References Cited

U.S. PATENT DOCUMENTS

| | | | | |
|---|---|---|---|---|
| 2019/0349155 A1* | 11/2019 | Xu | ........................ | H04L 5/0042 |
| 2021/0144599 A1* | 5/2021 | Awoniyi-Oteri | ...... | H04L 5/0053 |

FOREIGN PATENT DOCUMENTS

| | | | | |
|---|---|---|---|---|
| CN | 107251597 A | 10/2017 | | |
| CN | 108432314 A | 8/2018 | | |
| CN | 110350954 A | 10/2019 | | |
| WO | WO-2015141770 A1 * | 9/2015 | ............. | H04L 5/001 |

(Continued)

OTHER PUBLICATIONS

U.S. Appl. No. 62/933,137,Specification,Nov. 8, 2019 (Year: 2019).*

(Continued)

*Primary Examiner* — Ji-Hae Yea

(74) *Attorney, Agent, or Firm* — Volpe Koenig

(57) ABSTRACT

A user equipment (UE) is configured to receive a first message. The first message comprises information indicating a first cell and information indicating a second cell. The first cell and the second cell belong to a same cell group. The UE is configured to monitor at least one control signaling candidate comprised in a target control signaling candidate set. A number of monitorings performed on the at least one control signaling candidate is not greater than a first threshold value. The first threshold value is based on whether a scheduling cell set comprises the first cell.

18 Claims, 9 Drawing Sheets

100

Receiving first information —101

Monitoring at least one control signaling candidate comprised in target control signaling candidate set —102

(56)                    References Cited

FOREIGN PATENT DOCUMENTS

| WO | 2016119455 A1 | 8/2016 | |
| WO | 2016184220 A1 | 11/2016 | |
| WO | WO-2018143748 A1 * | 8/2018 | ........... H04L 5/0091 |
| WO | 2019127012 A1 | 7/2019 | |
| WO | 2019210512 A1 | 11/2019 | |
| WO | 2020015643 A1 | 1/2020 | |

OTHER PUBLICATIONS

U.S. Appl. No. 62/933,145,Specification,Nov. 8, 2019 (Year: 2019).*
WO2015141770A1—English Translation (Year: 2024).*
ISR of the international patent application PCT/CN2021/075167, dated Mar. 30, 2021.
First Office action of Chinese patent application No. 202010083178. 2, dated Jan. 30, 2022.
First search report of the Chinese patent application No. 202010083178. 2, dated Jan. 22, 2022.
Notification to Grant patent right for invention of the Chinese patent application No. 202010083178.2, dated Jul. 27, 2022.
Supplementary European search report and European search opinion on application EP21750310.1, dated May 22, 2023.
R1-1805881, Huawei, HiSilicon, Remaining issues on search space, Aug. 25, 2018.
Nokia, "Frequency-domain user-multiplexing for the E-UTRAN downlink," 3GPP TSG RAN WG1 LTE Ad Hoc Meeting, R1-060188, Helsinki, Finland (Jan. 23-25, 2006).
Third Generation Partnership Project, "Technical Specification Group Radio Access Network; NR; Physical channels and modulation (Release 16)," 3GPP TS 38.211 V16.0.0 (Dec. 2019).
Third Generation Partnership Project, "Technical Specification Group Radio Access Network; NR; Multiplexing and channel coding (Release 16)," 3GPP TS 38.212 V16.0.0 (Dec. 2019).
Third Generation Partnership Project, "Technical Specification Group Radio Access Network; NR; Physical layer procedures for control (Release 15)," 3GPP TS 38.213 V16.0.0 (Dec. 2019).
Third Generation Partnership Project, "Technical Specification Group Radio Access Network; NR; Radio Resource Control (RRC) protocol specification (Release 15)," 3GPP TS 38.331 V15.12.0 (Dec. 2020).
Ericsson, "New WID on NR Dynamic spectrum sharing (DSS)," 3GPP TSG RAN Meeting #86, RP-193232, Sitges, Spain (Dec. 9-12, 2019).
Nokia et al., "Remaining details on search space," 3GPP TSG RAN WG1 Ad Hoc 1801, R1-1800551, Vancouver, Canada (Jan. 22-26, 2018).

* cited by examiner

100

A serving cell other than scheduled cell set comprised in configuration cell group A serving cell belonging to scheduled cell set $\Sigma$= first sum value Frequency $\Sigma$= first characteristic sum value

| Index of subcarrier spacing | Candidate parameter |
|:---:|:---:|
| 0 | 44 |
| 1 | 36 |
| 2 | 22 |
| 3 | 20 |

FIG. 15

METHOD AND DEVICE IN COMMUNICATION NODES FOR A MULTICARRIER TRANSMISSION IN WIRELESS COMMUNICATIONS

CROSS REFERENCE TO RELATED APPLICATIONS

This application is the continuation of the International patent application No. PCT/CN2021/075167, filed on Feb. 4, 2021, which claims the priority benefit of Chinese Patent Application No. 202010083178.2, filed on Feb. 8, 2020, the full disclosure of which is incorporated herein by reference.

BACKGROUND

Technical Field

The present application relates to transmission methods and devices in wireless communication systems, and in particular to a multicarrier transmission method and device in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. The Work Item (WI) of NR was approved at 3GPP RAN #75th plenary to standardize NR.

In order to adapt to a variety of application scenarios and meet different needs, NR-backed WIs of Dynamic Spectrum Sharing (DSS) and Multi-Radio Dual-Connectivity (MR-DC) enhancement were approved at 3GPP RAN #85 plenary to support more flexible and efficient multicarrier communications.

SUMMARY

In the process of multicarrier communications, such as Carrier Aggregation (CA), cross-carrier scheduling is supported. In networks supported by the existing standards, such as R16 and previous versions of Long Term Evolution (LTE) and New Radio (NR), for data transmission in a Primary Component Carrier (PCC) or a Primary Cell (PCell), only self-scheduling of this carrier is supported instead of cross-carrier scheduling of a Secondary Component Carrier (SCC) or a Secondary Cell (Scell) as a scheduling carrier. In the WI of DSS in R17, it is decided to support cross-carrier scheduling of an Scell to a PCell.

The application discloses a solution to the scheduling problem in networks supporting multicarrier transmissions. It should be noted that though the present application only took DSS for example in the statement above, this application is also applicable to scenarios other than DSS (such as other multicarrier or multi-channel transmissions, or other networks with specific requirements for data scheduling) confronting similar problems, where similar technical effects can be achieved. Besides, a unified solution for different scenarios (including but not limited to scenarios of DSS and multicarrier transmissions) can also help reduce hardware complexity and cost. If no conflict is incurred, embodiments in a first node in the present application and the characteristics of the embodiments are also applicable to a second node, and vice versa. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

receiving first information, the first information being used to determine a target cell, the target cell being used to schedule a characteristic cell, and the characteristic cell and the target cell belonging to a same cell group; and monitoring at least one control signaling candidate comprised in a target control signaling candidate set, the target control signaling candidate set comprising at least one control signaling candidate;

herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; a Subcarrier Spacing (SCS) of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

In one embodiment, the first threshold value is determined according to at least one of whether the scheduling cell set comprises the target cell or whether the characteristic cell is the same as the target cell, thereby ensuring that a number of monitoring(s) performed by a UE on PDCCH candidates does not exceed a maximum blind detection capability of the UE when there exist multiple serving cells capable of scheduling a serving cell, thus ensuring a correct reception of the PDCCH by the UE.

In one embodiment, the first threshold value is determined according to at least one of whether the scheduling cell set comprises the target cell or whether the characteristic cell is the same as the target cell, so as to set a maximum number of monitoring(s) performed by a UE on PDCCH candidates according to whether there exist multiple serving cells scheduling a serving cell, which will not excessively limit a maximum number of monitoring(s) performed by the UE under the condition that the number of monitoring(s) performed by the UE on the PDCCH candidates does not exceed a maximum blind detection capability of the UE, while ensuring the correct reception of the PDCCH by the UE, the blocking probability of the PDCCH is reduced as far as possible, thus improving the transmission performance of the PDCCH.

According to one aspect of the present application, the above method is characterized in also comprising:

receiving second information;

herein, the second information is used to determine a configuration cell group, and the configuration cell group comprises multiple serving cells; the target cell belongs to the configuration cell group, the characteristic cell belongs to the configuration cell group, and the characteristic cell is a PCell in the configuration cell group; a scheduled cell set comprises a serving cell scheduled by a serving cell comprised in the scheduling cell set, and the scheduled cell set comprises at least one serving cell; any serving cell comprised in the scheduling cell set belongs to the configuration cell group, and any serving cell comprised in the scheduled cell set belongs to the configuration cell group.

According to one aspect of the present application, the method is characterized in that a target proportional value is used to determine the first threshold value, the target proportional value is a positive number not greater than 1, and the target proportional value is equal to one of a first proportional value or a second proportional value; the first proportional value is equal to a ratio of a first sum value and a first characteristic sum value, and the second proportional value is equal to a ratio of the second sum value and a second characteristic sum value; the first sum value is a positive number, the first characteristic sum value is a positive number not less than the first sum value, the second sum value is a positive number, the second characteristic sum value is a positive number not less than the second sum value, and the first proportional value and the second proportional value are not equal; at least one of whether the scheduling cell set comprises the target cell or whether the characteristic cell is the same as the target cell is used to determine the target proportional value between the first proportional value and the second proportional value.

According to one aspect of the present application, the above method is characterized in also comprising:

receiving third information;

herein, the third information is used to determine a first cell subset and a second cell subset, the first cell subset comprises at least one serving cell, and the second cell subset comprises at least one serving cell; a number of serving cell(s) belonging to the first cell subset comprised in the scheduled cell set is equal to a first number, and a number of serving cell(s) belonging to the second cell subset comprised in the scheduled cell set is equal to a second number; the first characteristic sum value is linearly correlated with a product of a number of serving cell(s) comprised in the second cell subset and a first factor, and the first characteristic sum value is linearly correlated with a number of serving cell(s) comprised in the first cell subset; the first sum value is linearly correlated with a product of the second number and the first factor, and the first sum value is linearly correlated with the first number; the first factor is configurable, or the first factor is pre-defined.

In one embodiment, serving cells comprised in the scheduled cell set are divided into serving cell(s) comprised in the first cell subset and serving cell(s) comprised in the second cell subset, so that when there exist multiple serving cells scheduling one serving cell, capabilities of multiple Transmit Receive Points (TRPs) or panels of each serving cell are taken into account while setting a maximum number of monitoring(s) performed by the UE on a PDCCH candidate, so as to ensure a correct reception of the PDCCH when there exists a serving cell supporting the capabilities of multiple TRPs or panels.

According to one aspect of the present application, the above method is characterized in that the first characteristic sum value is equal to a number of serving cell(s) comprised in the configuration cell group; the first sum value is equal to a number of serving cell(s) comprised in the scheduled cell set.

According to one aspect of the present application, the above method in characterized in that the second sum value is equal to the first sum value, and the first characteristic sum value is not equal to the second characteristic sum value; a difference value between the second characteristic sum value and the first characteristic sum value is predefined, or a difference value between the second characteristic sum value and the first characteristic sum value is configurable.

In one embodiment, the second sum value is equal to the first sum value and a difference value between the second characteristic sum value and the first characteristic sum value is predefined or configurable, so as to enable that the distribution of a monitoring capability of the UE on the PDCCH candidate can change with whether there exist multiple serving cells scheduling one serving cell, which simplifies the design of the PDCCH while ensuring a correct reception of the PDCCH by the UE and can ensure that different application scenarios multiplex the same design.

According to one aspect of the present application, the above method is characterized in also comprising:

receiving fourth information;

herein, the fourth information is used to determine a second factor, the second factor is a positive number less than 1, the second factor is used to determine the second sum value, the second sum value is not equal to the first sum value, and the second characteristic sum value is equal to the first characteristic sum value.

According to one aspect of the present application, the above method is characterized in that the fourth information is used to determine a first number of monitoring(s) and a sum number of monitoring(s), the first number of monitoring(s) is equal to a number of monitoring(s) performed on at least one control signaling candidate used to schedule the characteristic cell in the target cell, and the sum number of the monitoring(s) is equal to a total number of monitoring(s) performed on at least one control signaling candidate used to schedule the characteristic cell; the second factor is linearly correlated with a ratio of the first number of monitoring(s) and the sum number of the monitoring(s).

In one embodiment, the second factor is linearly correlated with a ratio of the first number of monitoring(s) and the sum number of monitoring(s), so as to ensure that distributed PDCCH blind detection capabilities match a number of required PDCCH candidates, a payload matching of the PDCCH is implemented while ensuring a correct reception of the PDCCH, which further reduces the blocking probability of the PDCCH, thus improving the transmission performance of the PDCCH.

According to one aspect of the present application, the above method is characterized in that the first SCS is one of X candidate SCSs, X being a positive integer greater than 1; the X candidate SCSs respectively correspond to X candidate parameters, and each of the X candidate parameters is a positive integer; a first parameter is a candidate parameter corresponding to the first SCS among the X candidate parameters, the first threshold value is equal to a target value rounded down to an integer, and the first parameter is used to determine the target value.

According to one aspect of the present application, the above method is characterized in that the characteristic cell comprises a characteristic sub-band, the characteristic sub-band comprises at least one subcarrier, an SCS of any subcarrier comprised in the characteristic sub-band is equal to a second SCS, and the first SCS is not equal to the second SCS.

According to one aspect of the present application, the above method is characterized in also comprising:

transmitting fifth information;

herein, the fifth information is used to indicate a first capability parameter, and the first capability parameter is a positive integer; the first capability parameter is used to determine the first threshold value.

The present application provides a method in a second node for wireless communications, comprising:

transmitting first information, the first information being used to indicate a target cell, the target cell being used to schedule a characteristic cell, and the characteristic cell and the target cell belonging to a same cell group; and determining at least one control signaling candidate comprised in a target control signaling candidate set, the target control signaling candidate set comprising at least one control signaling candidate;

herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

According to one aspect of the present application, the above method is characterized in also comprising:

transmitting second information;

herein, the second information is used to indicate a configuration cell group, and the configuration cell group comprises multiple serving cells; the target cell belongs to the configuration cell group, the characteristic cell belongs to the configuration cell group, and the characteristic cell is a PCell in the configuration cell group; a scheduled cell set comprises a serving cell scheduled by a serving cell comprised in the scheduling cell set, and the scheduled cell set comprises at least one serving cell; any serving cell comprised in the scheduling cell set belongs to the configuration cell group, and any serving cell comprised in the scheduled cell set belongs to the configuration cell group.

According to one aspect of the present application, the method is characterized in that a target proportional value is used to determine the first threshold value, the target proportional value is a positive number not greater than 1, and the target proportional value is equal to one of a first proportional value or a second proportional value; the first proportional value is equal to a ratio of a first sum value and a first characteristic sum value, and the second proportional value is equal to a ratio of the second sum value and a second characteristic sum value; the first sum value is a positive number, the first characteristic sum value is a positive number not less than the first sum value, the second sum value is a positive number, the second characteristic sum value is a positive number not less than the second sum value, and the first proportional value and the second proportional value are not equal; at least one of whether the scheduling cell set comprises the target cell or whether the characteristic cell is the same as the target cell is used to determine the target proportional value between the first proportional value and the second proportional value.

According to one aspect of the present application, the above method is characterized in also comprising:

transmitting third information;

herein, the third information is used to indicate a first cell subset and a second cell subset, the first cell subset comprises at least one serving cell, and the second cell subset comprises at least one serving cell; a number of serving cell(s) belonging to the first cell subset comprised in the scheduled cell set is equal to a first number, and a number of serving cell(s) belonging to the second cell subset comprised in the scheduled cell set is equal to a second number; the first characteristic sum value is linearly correlated with a product of a number of serving cell(s) comprised in the second cell subset and a first factor, and the first characteristic sum value is linearly correlated with a number of serving cell(s) comprised in the first cell subset; the first sum value is linearly correlated with a product of the second number and the first factor, and the first sum value is linearly correlated with the first number; the first factor is configurable, or the first factor is pre-defined.

According to one aspect of the present application, the above method is characterized in that the first characteristic sum value is equal to a number of serving cell(s) comprised in the configuration cell group; the first sum value is equal to a number of serving cell(s) comprised in the scheduled cell set.

According to one aspect of the present application, the above method in characterized in that the second sum value is equal to the first sum value, and the first characteristic sum value is not equal to the second characteristic sum value; a difference value between the second characteristic sum value and the first characteristic sum value is predefined, or a difference value between the second characteristic sum value and the first characteristic sum value is configurable.

According to one aspect of the present application, the above method is characterized in also comprising:

transmitting fourth information;

herein, the fourth information is used to indicate a second factor, the second factor is a positive number less than 1, the second factor is used to determine the second sum value, the second sum value is not equal to the first sum value, and the second characteristic sum value is equal to the first characteristic sum value.

According to one aspect of the present application, the above method is characterized in that the fourth information is used to indicate a first number of monitoring(s) and a sum number of monitoring(s), the first number of monitoring(s) is equal to a number of monitoring(s) performed on at least one control signaling candidate used to schedule the characteristic cell in the target cell, and the sum number of the monitoring(s) is equal to a total number of monitoring(s) performed on at least one control signaling candidate used to schedule the characteristic cell; the second factor is linearly correlated with a ratio of the first number of monitoring(s) and the sum number of the monitoring(s).

According to one aspect of the present application, the above method is characterized in that the first SCS is one of X candidate SCSs, X being a positive integer greater than 1; the X candidate SCSs respectively correspond to X candidate parameters, and each of the X candidate parameters is a positive integer; a first parameter is a candidate parameter corresponding to the first SCS among the X candidate parameters, the first threshold value is equal to a target value rounded down to an integer, and the first parameter is used to determine the target value.

According to one aspect of the present application, the above method is characterized in that the characteristic cell comprises a characteristic sub-band, the characteristic sub-band comprises at least one subcarrier, an SCS of any subcarrier comprised in the characteristic sub-band is equal to a second SCS, and the first SCS is not equal to the second SCS.

According to one aspect of the present application, the above method is characterized in also comprising:

receiving fifth information;

herein, the fifth information is used to indicate a first capability parameter, and the first capability parameter is a positive integer; the first capability parameter is used to determine the first threshold value.

The present application provides a first node for wireless communications, comprising:

a first processor, receiving first information, the first information being used to determine a target cell, the target cell being used to schedule a characteristic cell, and the characteristic cell and the target cell belonging to a same cell group; and a first receiver, monitoring at least one control signaling candidate comprised in a target control signaling candidate set, the target control signaling candidate set comprising at least one control signaling candidate;

herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

The present application provides a second node for wireless communications, comprising:

a second processor, transmitting first information, the first information being used to indicate a target cell, the target cell being used to schedule a characteristic cell, and the characteristic cell and the target cell belonging to a same cell group; and a first transmitter, determining at least one control signaling candidate comprised in a target control signaling candidate set, the target control signaling candidate set comprising at least one control signaling candidate;

herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

In one embodiment, the method in the present application is advantageous in the following aspects:

the method in the present application ensures that when there exist multiple serving cells capable of scheduling one serving cell, a number of monitoring(s) performed by the UE on the PDCCH candidate does not exceed a maximum blind detection capability of the UE, thus ensuring a correct reception of the PDCCH by the UE.

the method in the present application sets a maximum number of monitoring(s) performed by the UE on the PDCCH candidate according to whether there exist multiple serving cells scheduling one serving cell, which will not excessively limit a maximum number of monitoring(s) of the UE under the condition that the a number of monitoring(s) performed by the UE on the PDCCH candidate does not exceed a maximum blind detection capability of the UE, the blocking probability of the PDCCH is reduced as far as possible while ensuring the correct reception of the PDCCH by the UE, so as to improve the transmission performance of the PDCCH.

by adopting the method in the present application, when there exist multiple serving cells scheduling one serving cell, capabilities of multiple TRPs or panels of each serving cell are taken into account while setting a maximum number of monitoring(s) performed by the UE on a PDCCH candidate, so as to ensure a correct reception of the PDCCH when there exists a serving cell supporting the capabilities of multiple TRPs or panels.

the method in the present application enables that the distribution of a monitoring capability of the UE on the PDCCH candidate can change with whether there exist multiple serving cells scheduling one serving cell, which simplifies the design of the PDCCH while ensuring a correct reception of the PDCCH by the UE and can ensure that different application scenarios multiplex the same design the method in the present application ensure that distributed PDCCH blind detection capabilities match a number of required PDCCH candidates, and a payload matching of the PDCCH is implemented while ensuring a correct reception of the PDCCH, which further reduces the blocking probability of the PDCCH, thus improving the transmission performance of the PDCCH

BRIEF DESCRIPTION OF THE DRAWINGS

Other features, objects and advantages of the present application will become more apparent from the detailed description of non-restrictive embodiments taken in conjunction with the following drawings:

FIG. 15 illustrates a schematic diagram of a relation between a first parameter and a first SCS according to one embodiment of the present application;

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
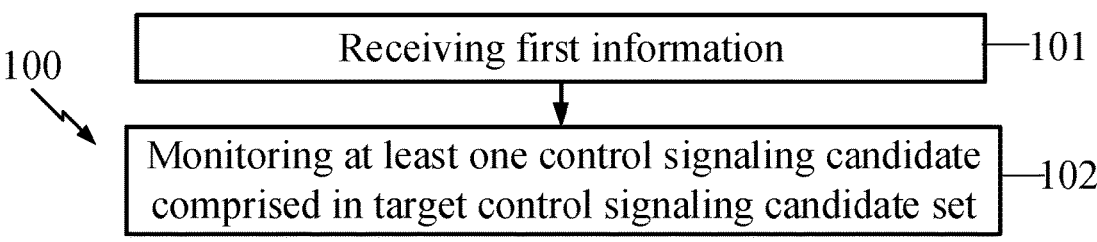
FIG. 1 illustrates a flowchart of first information and at least one control signaling candidate comprised in a target control signaling candidate set according to one embodiment of the present application.

Embodiment 1 illustrates a flowchart of first information and at least one control signaling candidate comprised in a target control signaling candidate set according to one embodiment of the present application, as shown in FIG. 1. In FIG. 1, each box represents a step. Particularly, the sequential order of steps in these boxes does not necessarily mean that the steps are chronologically arranged.

In embodiment 1, a first node in the present application receives first information in step 101, the first information is used to determine a target cell, the target cell is used to schedule a characteristic cell, and the characteristic cell and the target cell belong to a same cell group; the first node in the present application monitors at least one control signaling candidate comprised in a target control signaling candidate set in step 102, the target control signaling candidate set comprises at least one control signaling candidate; herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

In one embodiment, the first information is transmitted via an air interface.

In one embodiment, the first information is transmitted via a radio interface.

In one embodiment, the first information is transmitted via a higher-layer signaling.

In one embodiment, the first information is transmitted via a physical-layer signaling.

In one embodiment, the first information comprises all or part of a higher-layer signaling.

In one embodiment, the first information comprises all or part of a physical-layer signaling.

In one embodiment, the first information comprises all or partial Information Elements (IEs) in a Radio Resource Control (RRC) signaling.

In one embodiment, the first information comprises all or partial fields in an IE in an RRC signaling.

In one embodiment, the first information comprises all or part of a Medium Access Control (MAC) layer signaling.

In one embodiment, the first information comprises all or part of a System Information Block (SIB).

In one embodiment, the first information is transmitted through a Downlink Shared Channel (DL-SCH).

In one embodiment, the first information is transmitted through a Physical Downlink Shared Channel (PDSCH).

In one embodiment, the first information is cell-specific.

In one embodiment, the first information is UE-specific.

In one embodiment, the first information is carrier-specific.

In one embodiment, the first information is configured per carrier.

In one embodiment, the first information is serving cell-specific.

In one embodiment, the first information is configured per serving cell.

In one embodiment, the first information comprises all or partial fields of a Downlink Control Information (DCI) signaling.

In one embodiment, the first information belongs to an IE "CrossCarrierSchedulingConfig" in an RRC signaling.

In one embodiment, the first information belongs to an IE "ServingCellConfig" in an RRC signaling.

In one embodiment, the first information belongs to an IE "CrossCarrierSchedulingConfig" in an RRC signaling of a configuration PCell.

In one embodiment, the first information belongs to an IE "ServingCellConfig" in an RRC signaling of a configuration PCell.

In one embodiment, the first information comprises a field "schedulingCellId" in an IE "CrossCarrierSchedulingConfig" in an RRC signaling.

In one embodiment, the first information comprises a field "schedulingCellId" in an IE "CrossCarrierSchedulingConfig" in an RRC signaling of a configuration PCell.

In one embodiment, the first information comprises a field "schedulingCellInfo" in an IE "CrossCarrierSchedulingConfig" in an RRC signaling.

In one embodiment, the first information comprises a CHOICE "own" or "other" in a field "schedulingCellInfo" in an IE "CrossCarrierSchedulingConfig" in an RRC signaling.

In one embodiment, the above phrase of "the first information being used to determine a target cell" comprises the following meaning: the first information is used by the first node in the present application to determine the target cell.

In one embodiment, the above phrase of "the first information being used to determine a target cell" comprises the following meaning: the first information is used to explicitly indicate the target cell.

In one embodiment, the above phrase of "the first information being used to determine a target cell" comprises the following meaning: the first information is used to implicitly indicate the target cell.

In one embodiment, the above phrase of "the first information being used to determine a target cell" comprises the following meaning: the first information is used to indirectly indicate the target cell.

In one embodiment, the above phrase of "the first information being used to determine a target cell" comprises the following meaning: the first information is used to indicate a Serving Cell Index (ServCellIndex) of the target cell.

In one embodiment, the above phrase of "the first information being used to determine a target cell" comprises the following meaning: the first information is used to indicate whether the target cell is the same as the characteristic cell.

In one embodiment, the above phrase of "the first information being used to determine a target cell" comprises the following meaning: the first information is used to indicate whether the target cell is the same as a serving cell to which frequency-domain resources occupied by a signal carrying the first information belong.

In one embodiment, the above phrase of "the first information being used to determine a target cell" comprises the following meaning: the first information is used to indicate whether the target cell is the same as the characteristic cell; when the target cell and the characteristic cell are different, the first information is also used to indicate a ServCellIndex of the target cell.

In one embodiment, the above phrase of "the first information being used to determine a target cell" comprises the following meaning: the first information is used to indicate whether the target cell is the same as a serving cell to which frequency-domain resources occupied by a signal carrying the first information belong; when the target cell and a serving cell to which frequency-domain resources occupied by a signal carrying the first information belong are different, the first information is also used to indicate a ServCellIndex of the target cell.

In one embodiment, a serving cell scheduling another serving cell refers to that a Physical Downlink Control Channel (PDCCH) transmitted on a serving cell schedules a signal on another serving cell.

In one embodiment, a serving cell scheduling another serving cell refers to that a Physical Downlink Control Channel (PDCCH) transmitted on a serving cell schedules another serving cell.

In one embodiment, the target cell is a serving cell.

In one embodiment, the target cell corresponds to a Component Carrier (CC).

In one embodiment, the target cell is a serving cell corresponding to a CC in a Carrier Aggregation (CA).

In one embodiment, the target cell is a serving cell in a Master Cell Group (MCG) in a CA.

In one embodiment, the target cell is a serving cell in a Secondary Cell Group (SCG) in a CA.

In one embodiment, the target cell is a serving cell corresponding to a CC in a Master Cell Group (MCG) in a CA.

In one embodiment, the target cell is a serving cell corresponding to a CC in an SCG in a CA.

In one embodiment, the target cell is a serving cell corresponding to a PCC.

In one embodiment, the target cell is a PCell.

In one embodiment, the target cell is an Spcell.

In one embodiment, the target cell is a serving cell corresponding to a Secondary Component Carrier (SCC).

In one embodiment, the target cell is an Scell.

In one embodiment, the characteristic cell is a serving cell.

In one embodiment, the characteristic cell corresponds to an CC.

In one embodiment, the characteristic cell is a serving cell corresponding to a CC in a CA.

In one embodiment, the characteristic cell is a serving cell in an MCG in a CA.

In one embodiment, the characteristic cell is a serving cell in an SCG in a CA.

In one embodiment, the characteristic cell is a serving cell corresponding to a CC in an MCG in a CA.

In one embodiment, the characteristic cell is a serving cell corresponding to a CC in an SCG in a CA.

In one embodiment, the characteristic cell is a serving cell corresponding to a PCC.

In one embodiment, the characteristic cell is a PCell.

In one embodiment, the characteristic cell is an Spcell.

In one embodiment, the characteristic cell is a PCell in an MCG, or the characteristic cell is a PCell in an SCG.

In one embodiment, the target cell and the characteristic cell are the same.

In one embodiment, the target cell and the characteristic cell are different.

In one embodiment, a serving cell to which frequency-domain resources occupied by a signal carrying the first information belong is the same as the characteristic cell.

In one embodiment, a serving cell to which frequency-domain resources occupied by a signal carrying the first information belong is different from the characteristic cell.

In one embodiment, the above phrase of "the target cell being used to schedule a characteristic cell" comprises the following meaning: a PDCCH transmitted on the target cell is used to schedule a signal transmitted on the characteristic cell.

In one embodiment, the above phrase of "the target cell being used to schedule a characteristic cell" comprises the following meaning: when the target cell and the characteristic cell are the same, a PDCCH transmitted on the target cell is used to self-schedule a signal transmitted on the characteristic cell; when the target cell is different from the characteristic cell, a PDCCH transmitted on the target cell is used to cross-schedule a signal transmitted on the characteristic cell.

In one embodiment, the above phrase of "the target cell being used to schedule a characteristic cell" comprises the following meaning: the target cell is a scheduling cell of the characteristic cell.

In one embodiment, the above phrase of "the target cell being used to schedule a characteristic cell" comprises the following meaning: the characteristic cell is a scheduled cell of the target cell.

In one embodiment, a cell group to which the characteristic cell and the target cell belong is an MCG.

In one embodiment, a cell group to which the characteristic cell and the target cell belong is an SCG.

In one embodiment, a monitoring performed on a control signaling candidate comprised in the target control signaling candidate set is implemented by decoding a control signaling candidate comprised in the target control signaling candidate set.

In one embodiment, a monitoring performed on a control signaling candidate comprised in the target control signaling candidate set is implemented by blindly decoding a control signaling candidate comprised in the target control signaling candidate set.

In one embodiment, a monitoring performed on a control signaling candidate comprised in the target control signaling candidate set is implemented by decoding a control signaling candidate comprised in the target control signaling candidate set and a CRC check.

In one embodiment, a monitoring performed on a control signaling candidate comprised in the target control signaling candidate set is implemented by decoding a control signaling candidate comprised in the target control signaling candidate set and a CRC check scrambled by a Radio Network Temporary Identity (RNTI).

In one embodiment, a monitoring performed on a control signaling candidate comprised in the target control signaling candidate set is implemented by decoding a control signaling candidate comprised in the target control signaling candidate set based on a monitored DCI format.

In one embodiment, a monitoring performed on a control signaling candidate comprised in the target control signaling candidate set is implemented by decoding each control signaling candidate comprised in the target control signaling candidate set based on one or multiple monitored DCI formats.

In one embodiment, the target control signaling candidate set only comprises a control signaling candidate.

In one embodiment, the target control signaling candidate set comprises multiple control signaling candidates.

In one embodiment, any control signaling candidate comprised in the target control signaling candidate set occupies at least one Control Channel Element (CCE).

In one embodiment, any control signaling candidate comprised in the target control signaling candidate set occupies at least one Resource Element (RE) in time-frequency domain.

In one embodiment, any control signaling candidate comprised in the target control signaling candidate set occupies time-frequency resources in time-frequency domain.

In one embodiment, any control signaling candidate comprised in the target control signaling candidate set is a Physical Downlink Control Channel (PDCCH) candidate.

In one embodiment, any control signaling candidate comprised in the target control signaling candidate set is a Monitored PDCCH Candidate.

In one embodiment, any control signaling candidate comprised in the target control signaling candidate set is a Physical Downlink Control Channel (PDCCH) candidate adopting a DCI format.

In one embodiment, any control signaling candidate comprised in the target control signaling candidate set is a time-frequency resource set that may carry a DCI with a specific format.

In one embodiment, when the target control signaling candidate set comprises multiple control signaling candidates, the target control signaling candidate set comprises two control signaling candidates occupying same time-frequency resources.

In one embodiment, when the target control signaling candidate set comprises multiple control signaling candidates, time-frequency resources occupied by any two control signaling candidates comprised in the target control signaling candidate set are different.

In one embodiment, the first sub-band set only comprises one sub-band.

In one embodiment, the first sub-band set comprises multiple sub-bands.

In one embodiment, any sub-band comprised in the first sub-band set is a Bandwidth Part (BWP).

In one embodiment, any sub-band comprised in the first sub-band set is an Active Downlink Bandwidth Part (Active DL BWP).

In one embodiment, any sub-band comprised in the first sub-band set is continuous frequency-domain resources with same numerology in a carrier bandwidth.

In one embodiment, any sub-band comprised in the first sub-band set is subcarriers continuous in frequency domain with same numerology in a carrier bandwidth.

In one embodiment, any sub-band comprised in the first sub-band set is a common resource block subset comprising continuous common resource blocks (CRBs) for given numerology on a given carrier.

In one embodiment, a serving cell to which any sub-band comprised in the first sub-band set belongs is a serving cell corresponding to a carrier to which any sub-band comprised in the first sub-band set belongs.

In one embodiment, when the first sub-band set comprises multiple sub-bands, any two sub-bands comprised in the first sub-band set respectively belong to two different carriers.

In one embodiment, when the first sub-band set comprises multiple sub-band, any two sub-bands comprised in the first sub-band set respectively belong to two different serving cells.

In one embodiment, when the first sub-band set comprises multiple sub-bands, there exist two sub-bands in the first sub-band set respectively belonging to a same carrier.

In one embodiment, when the first sub-band set comprises multiple sub-bands, there exist two sub-bands in the first sub-band set respectively belonging to a same serving cell.

In one embodiment, the first control signaling candidate can be any control signaling candidate comprised in the target control signaling candidate set.

In one embodiment, the first control signaling candidate is a given control signaling candidate comprised in the target control signaling candidate set.

In one embodiment, frequency-domain resources occupied by any control signaling candidate comprised in the target control signaling candidate set belong to a sub-band comprised in the first sub-band set.

In one embodiment, a sub-band comprised in the first sub-band set comprises frequency-domain resources occupied by a control signaling comprised in the target control signaling candidate set.

In one embodiment, the first sub-band set comprises frequency-domain resources occupied by all control signaling candidates in the target control signaling candidate set.

In one embodiment, a sub-band comprised in the first sub-band set does not comprise frequency-domain resources occupied by any control signaling candidate in the target control signaling candidate set.

In one embodiment, any sub-band comprised in the first sub-band set comprises frequency-domain resources occupied by a control signaling in the target control signaling candidate set.

In one embodiment, any sub-band comprised in the first sub-band set is configurable.

In one embodiment, any sub-band comprised in the first sub-band set is configured by an IE "BWP-Downlink".

In one embodiment, any sub-band comprised in the first sub-band set is a BWP indicated by an IE "downlinkBWP-ToAddModList".

In one embodiment, time-frequency resources occupied by each control signaling candidate in the target control signaling candidate set is configured by a signaling "SearchSpace".

In one embodiment, time-frequency resources occupied by each control signaling candidate in the target control signaling candidate set is configured by a signaling "ControlResourceSet".

In one embodiment, time-frequency resources occupied by each control signaling candidate in the target control signaling candidate set is configured by a signaling "SearchSpace" and a signaling "ControlResource Set".

In one embodiment, also comprising:
receiving sixth information;

herein, the sixth information is used to determine an SCS of a subcarrier in each sub-band in the first sub-band set and in each sub-band in the first sub-band set.

In one embodiment, also comprising:
receiving seventh information;
herein, the seventh information is used to determine time-frequency resources occupied by each control signaling candidate in the target control signaling candidate set.

receiving seventh information;
herein, the seventh information is used to determine a sub-band in the first sub-band set to which time-frequency resources occupied by each control signaling candidate in the target control signaling candidate set belong.

In one embodiment, also comprising:
receiving sixth information; and
receiving seventh information;
herein, the sixth information is used to determine an SCS of a subcarrier comprised in each sub-band in the first sub-band set and in each sub-band in the first sub-band set, and the seventh information is used to determine frequency-domain resources occupied by each control signaling candidate in the target control signaling candidate set in a sub-band in the first sub-band set.

In one embodiment, the first time window is a slot.

In one embodiment, the first time window is a slot corresponding to the first SCS.

In one embodiment, the first time window comprises at least one continuous Orthogonal Frequency Division Multiplexing (OFDM) symbol in time domain.

In one embodiment, the first time window comprises at least one continuous OFDM symbol in time domain corresponding to the first SCS.

In one embodiment, the first time window is a span.

In one embodiment, the first time window is a span corresponding to the first SCS.

In one embodiment, the first time window is a time interval with a shortest length of a time interval between earliest OFDM symbols in two PDCCH occasions.

In one embodiment, time-domain resources occupied by any control signaling candidate comprised in the target control signaling candidate set belong to the first time window.

In one embodiment, time-domain resources occupied by any control signaling candidate comprised in the target control signaling candidate set are a part of the first time window.

In one embodiment, the scheduling cell set only comprises one serving cell.

In one embodiment, the scheduling cell set comprises multiple serving cells.

In one embodiment, any serving cell comprised in the scheduling cell set is an activated cell.

In one embodiment, the scheduling cell set comprises a serving cell that is deactivated.

In one embodiment, any serving cell comprised in the scheduling cell set comprises an active BWP.

In one embodiment, the scheduling cell set comprises a serving cell that comprises a non-active BWP.

In one embodiment, a number of serving cell(s) comprised in the scheduling cell set is equal to a number of sub-band(s) comprised in the first sub-band set.

In one embodiment, a number of serving cell(s) comprised in the scheduling cell set is not equal to a number of sub-band(s) comprised in the first sub-band set.

In one embodiment, the above phrase of "a serving cell to which any sub-band comprised in the first sub-band set belongs belonging to the scheduled cell set" comprises the following meaning: the scheduling cell set comprises a serving cell to which any sub-band comprised in the first sub-band set belongs.

In one embodiment, the above phrase of "a serving cell to which any sub-band comprised in the first sub-band set belongs belonging to the scheduled cell set" comprises the following meaning: the scheduling cell set only comprises a serving cell to which a sub-band comprised in the first sub-band set belongs.

In one embodiment, the scheduling cell set also comprises a serving cell other than a serving cell to which a sub-band comprised in the first sub-band set belongs.

In one embodiment, the above phrase of "a serving cell to which any sub-band comprised in the first sub-band set belongs belonging to the scheduled cell set" comprises the following meaning: the first sub-band set comprises M sub-band(s), the scheduling cell set comprises M serving cell(s), and the M serving cell(s) comprises(respectively comprise) the M sub-band(s), M being a positive integer.

In one embodiment, the above phrase of "a serving cell to which any sub-band comprised in the first sub-band set belongs belonging to the scheduled cell set" comprises the following meaning: the first sub-band set comprises M sub-band(s), the scheduling cell set comprises M serving cell(s), the M sub-band(s) is(are respectively) BWP(s) of the M serving cell(s), M being a positive integer.

In one embodiment, the above phrase of "a serving cell to which any sub-band comprised in the first sub-band set belongs belonging to the scheduled cell set" comprises the following meaning: the first sub-band set comprises M sub-band(s), the scheduling cell set comprises M serving cell(s), the M sub-band(s) belongs(respectively belong) to the M serving cells, M being a positive integer.

In one embodiment, the above phrase of "a serving cell to which any sub-band comprised in the first sub-band set belongs belonging to the scheduled cell set" comprises the following meaning: a serving cell corresponding to a carrier to which any sub-band comprised in the first sub-band set belongs belongs to the scheduling cell set.

In one embodiment, when the first sub-band set comprises multiple sub-bands, any two sub-bands in the first sub-band set comprise subcarriers with an equal SCS.

In one embodiment, an SCS of any subcarrier comprised in any sub-band comprised in the first sub-band set is equal to the first SCS.

In one embodiment, the first sub-band set comprises multiple subcarriers, and SCSs of any two subcarriers comprised in the first sub-band set are equal.

In one embodiment, any sub-band comprised in the first sub-band set comprises at least one subcarrier.

In one embodiment, any sub-band comprised in the first sub-band set comprises a subcarrier of a positive integral multiple of 12.

In one embodiment, any sub-band comprised in the first sub-band set comprises at least one Physical Resource Block (PRB).

In one embodiment, the first SCS is equal to one of 15 kHz, 30 kHz, 60 kHz, 120 kHz or 240 kHz.

In one embodiment, the above phrase of "the first SCS being used to determine a time length of the first time window" comprises the following meaning: the first SCS is used by the first node in the present application to determine a time length of the first time window.

In one embodiment, the above phrase of "the first SCS being used to determine a time length of the first time window" comprises the following meaning: the first time window is a slot, the first SCS is used to determine a number of slot(s) comprised in a subframe, and a time length of the first time window is equal to a ratio of a length of a subframe to a number of slot(s) comprised in a subframe.

In one embodiment, the above phrase of "the first SCS being used to determine a time length of the first time window" comprises the following meaning: the first SCS is used to determine a time length of each OFDM symbol comprised in the first time window.

In one embodiment, the above phrase of "the first SCS being used to determine a time length of the first time window" comprises the following meaning: a configuration index of the first SCS is used to determine a time length of the first time window.

In one embodiment, the above phrase of "the first SCS being used to determine a time length of the first time window" comprises the following meaning: the first SCS is used to determine a time length of the first time window according to a corresponding relation.

In one embodiment, the above phrase of "the first SCS being used to determine a time length of the first time window" comprises the following meaning: the first SCS is used to determine a time length of the first time window according to a table corresponding relation.

In one embodiment, a number of monitoring(s) performed on at least one control signaling candidate comprised in the target control signaling candidate set is equal to a number of control signaling candidate(s) comprised in the target control signaling candidate set.

In one embodiment, a number of monitoring(s) performed on at least one control signaling candidate comprised in the target control signaling candidate set is greater than a number of control signaling candidate(s) comprised in the target control signaling candidate set.

In one embodiment, a number of monitoring(s) performed on at least one control signaling candidate comprised in the target control signaling candidate set is less than a number of control signaling candidate(s) comprised in the target control signaling candidate set.

In one embodiment, a maximum possible number of monitoring(s) performed on at least one control signaling candidate comprised in the target control signaling candidate set is equal to a number of monitored DCI format(s).

In one embodiment, a maximum possible number of monitoring(s) performed on at least one control signaling candidate comprised in the target control signaling candidate set is equal to a number of different DCI payload sizes comprised in a monitored DCI format.

In one embodiment, a maximum number of monitoring(s) performed on at least one control signaling candidate comprised in the target control signaling candidate set is not less a number of control signaling candidate(s) comprised in the target control signaling candidate set.

In one embodiment, a monitoring may be performed at least once for each control signaling candidate comprised in the target control signaling candidate set.

In one embodiment, a monitoring performed on a control signaling candidate comprised in the target control signaling candidate set is a decoding performed on a control signaling candidate comprised in the target control signaling candidate set.

In one embodiment, a monitoring performed on a control signaling candidate comprised in the target control signaling candidate set is a decoding performed on a control signaling candidate comprised in the target control signaling candidate set according to a given DCI format.

In one embodiment, a monitoring performed on a control signaling candidate comprised in the target control signaling candidate set is a decoding performed on a control signaling candidate comprised in the target control signaling candidate set according to a given DCI payload size.

In one embodiment, a number of monitoring(s) performed on at least one control signaling candidate comprised in the target control signaling candidate set may be equal to 0.

In one embodiment, a number of monitoring(s) performed on at least one control signaling candidate comprised in the target control signaling candidate set may be greater than 0.

In one embodiment, a number of monitoring(s) performed on at least one control signaling candidate comprised in the target control signaling candidate set is greater than 0.

In one embodiment, a number of monitoring(s) performed on at least one control signaling candidate comprised in the target control signaling candidate set is greater than or equal to 0.

In one embodiment, a number of monitoring(s) performed on at least one control signaling candidate comprised in the target control signaling candidate set refers to a sum number of monitoring(s) performed on all control signaling candidate comprised in the target control signaling candidate set.

In one embodiment, a number of monitoring(s) performed on at least one control signaling candidate comprised in the target control signaling candidate set refers to a total number of monitoring(s) performed on control signaling candidates comprised in the target control signaling candidate set.

In one embodiment, a number of monitoring(s) performed on at least one control signaling candidate comprised in the target control signaling candidate set refers to a maximum possible number of monitoring(s) performed on control signaling candidates comprised in the target control signaling candidate set.

In one embodiment, a number of monitoring(s) performed on at least one control signaling candidate comprised in the target control signaling candidate set refers to a maximum possible number of monitoring(s) performed on each control signaling candidate comprised in the target control signaling candidate set.

In one embodiment, in the process of monitoring a control signaling candidate comprised in the target control signaling candidate set, the first node in the present application may be terminated early.

In one embodiment, in the process of monitoring a control signaling candidate comprised in the target control signaling candidate set, the first node in the present application only monitors partial control signaling candidates in the target control signaling candidate set.

In one embodiment, the first threshold value may be equal to 0.

In one embodiment, the first threshold value is greater than 0.

In one embodiment, a number of monitoring(s) performed on a control signaling candidate comprised in the target control signaling candidate set is less than the first threshold value.

In one embodiment, a number of monitoring(s) performed on a control signaling candidate comprised in the target control signaling candidate set is equal to the first threshold value.

In one embodiment, the above phrase of "at least one of whether the scheduling cell set comprises the target cell or whether the characteristic cell is the same as the target cell being used to determine the first threshold value" comprises the following meaning: whether the scheduling cell set comprises the target cell and whether the characteristic cell is the same as the target cell are used together to determine the first threshold value.

In one embodiment, the above phrase of "at least one of whether the scheduling cell set comprises the target cell or whether the characteristic cell is the same as the target cell being used to determine the first threshold value" comprises the following meaning: whether the scheduling cell set comprises the target cell is used to determine the first threshold value.

In one embodiment, the above phrase of "at least one of whether the scheduling cell set comprises the target cell or whether the characteristic cell is the same as the target cell being used to determine the first threshold value" comprises the following meaning: whether the characteristic cell is the same as the target cell is used to determine the first threshold value.

In one embodiment, the above phrase of "at least one of whether the scheduling cell set comprises the target cell or whether the characteristic cell is the same as the target cell being used to determine the first threshold value" comprises the following meaning: at least one of whether the scheduling cell set comprises the target cell or whether the characteristic cell is the same as the target cell is used by the first node in the present application to determine the first threshold value.

In one embodiment, the above phrase of "at least one of whether the scheduling cell set comprises the target cell or whether the characteristic cell is the same as the target cell being used to determine the first threshold value" comprises the following meaning: at least one of whether the scheduling cell set comprises the target cell or whether the characteristic cell is the same as the target cell is used to determine the first threshold value according to a judgment condition.

In one embodiment, the above phrase of "at least one of whether the scheduling cell set comprises the target cell or whether the characteristic cell is the same as the target cell being used to determine the first threshold value" comprises the following meaning: at least one of whether the scheduling cell set comprises the target cell or whether the characteristic cell is the same as the target cell is used to determine the first threshold value according to a corresponding relation.

In one embodiment, the above phrase of "at least one of whether the scheduling cell set comprises the target cell or whether the characteristic cell is the same as the target cell being used to determine the first threshold value" comprises the following meaning: at least one of whether the scheduling cell set comprises the target cell or whether the characteristic cell is the same as the target cell is used to determine a calculation method of the first threshold value.

In one embodiment, the above phrase of "at least one of whether the scheduling cell set comprises the target cell or whether the characteristic cell is the same as the target cell being used to determine the first threshold value" comprises the following meaning: at least one of whether the scheduling cell set comprises the target cell or whether the characteristic cell is the same as the target cell is used to determine a calculation formula of the first threshold value.

In one embodiment, when the first node in the present application detects a control signaling in a control signaling candidate comprised in the target control signaling candidate set, the detected control signaling is used to schedule the characteristic cell.

In one embodiment, when the first node in the present application detects a control signaling in a control signaling candidate comprised in the target control signaling candidate set, the detected control signaling is used to schedule a cell other than the characteristic cell.

In one embodiment, the meaning of "whether the scheduling cell set comprises the target cell" comprises whether the scheduling cell set is used to schedule the characteristic cell.

In one embodiment, the meaning of "whether the scheduling cell set comprises the target cell" comprises whether the scheduling cell set comprises a serving cell used to schedule the characteristic cell.

In one embodiment, the meaning of "whether the scheduling cell set comprises the target cell" comprises whether the scheduling cell set is used to cross-carrier schedule the characteristic cell.

In one embodiment, the meaning of "whether the characteristic cell is the same as the target cell" comprises whether the characteristic cell and the target cell are a same serving cell.

In one embodiment, the meaning of "whether the characteristic cell is the same as the target cell" comprises whether the first node supports cross-carrier scheduling a PCell.

In one embodiment, the meaning of "whether the characteristic cell is the same as the target cell" comprises whether the first node supports cross-carrier scheduling a PSCell in an SCG.

In one embodiment, the meaning of "whether the characteristic cell is the same as the target cell" comprises whether the first node supports cross-carrier scheduling a Special Cell (Spcell).

Embodiment 2

Figure 2:
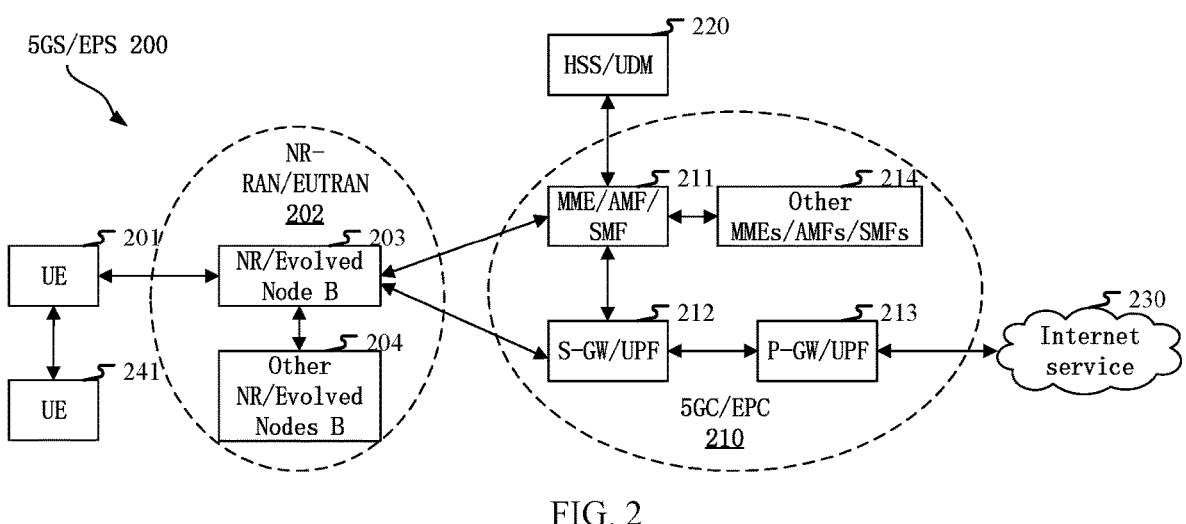
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN comprises an NR/evolved node B (gNB/eNB) 203 and other gNBs (eNBs) 204. The gNB (eNB) 203 provides UE 201-oriented user plane and control plane protocol terminations. The gNB (eNB) 203 may be connected to other gNBs (eNBs) 204 via an Xn/X2 interface (e.g., backhaul). The gNB (eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB (eNB) 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB (eNB) 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 supports multicarrier transmission.

In one embodiment, the UE 201 supports transmission of an SCC cross-carrier scheduling carrier PCC.

In one embodiment, the gNB(eNB) 201 corresponds to the second node in the present application.

In one embodiment, the gNB(eNB) 201 supports multicarrier transmission.

In one embodiment, the gNB(eNB) 201 supports transmission of an SCC cross-carrier scheduling a PCC.

Embodiment 3

Figure 3:
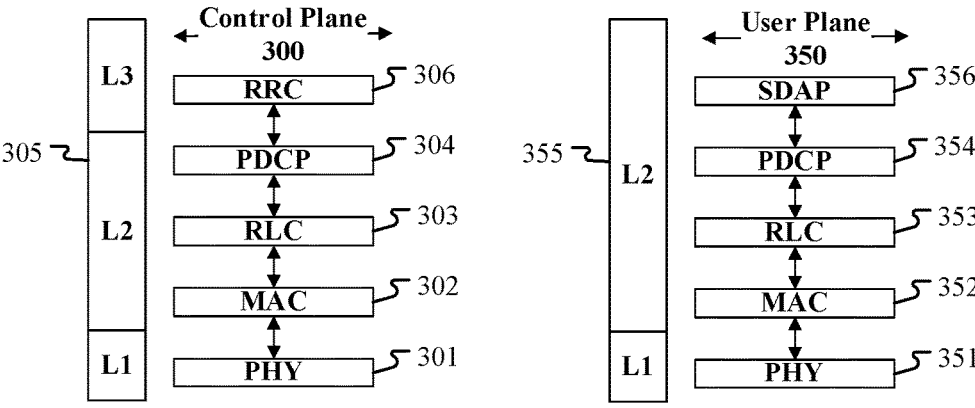
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE or gNB) and a second node (gNB or UE) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP)

sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The RRC sublayer 306 in layer 3(L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information in the present application is generated by the RRC 306.

In one embodiment, the first information in the present application is generated by the MAC 302 or the MAC 352.

In one embodiment, the first information in the present application is generated by the PHY 301 or the PHY 351.

In one embodiment, the second information in the present application is generated by the RRC 306.

In one embodiment, the second information in the present application is generated by the MAC 302 or the MAC 352.

In one embodiment, the second information in the present application is generated by the PHY 301 or the PHY 351.

In one embodiment, the third information in the present application is generated by the RRC 306.

In one embodiment, the third information in the present application is generated by the MAC 302 or the MAC 352.

In one embodiment, the third information in the present application is generated by the PHY 301 or the PHY 351.

In one embodiment, the fourth information in the present application is generated by the RRC 306.

In one embodiment, the fourth information in the present application is generated by the MAC 302 or the MAC 352.

In one embodiment, the fourth information in the present application is generated by the PHY 301 or the PHY 351.

In one embodiment, the fifth information in the present application is generated by the RRC 306.

In one embodiment, the fifth information in the present application is generated by the MAC 302 or the MAC 352.

Embodiment 4

Figure 4:
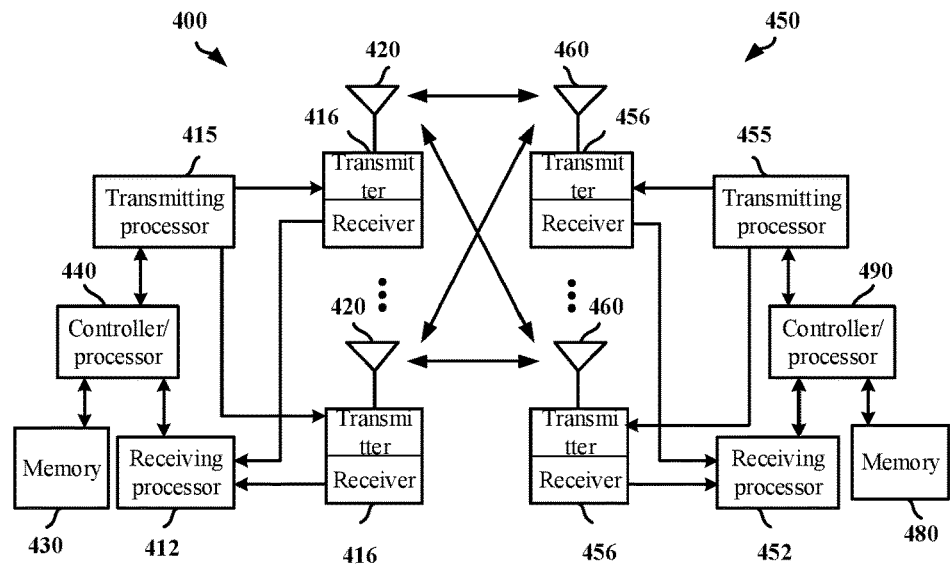
FIG. 4 illustrates a schematic diagram of a first node and a second node according to one embodiment of the present application.

Embodiment 4 illustrates a schematic diagram of a first node and a second node according to the present application, as shown in FIG. 4.

The first node (450) may comprise a controller/processor 490, a data source/buffer 480, a receiving processor 452, a transmitter/receiver 456 and a transmitting processor 455, where the transmitter/receiver 456 comprises an antenna 460.

The second node (410) may comprise a controller/processor 440, a data source/buffer 430, a receiving processor 412, a transmitter/receiver 416 and a transmitting processor 415, where the transmitter/receiver 416 comprises an antenna 420.

In Downlink (DL), a higher-layer packet (such as high-layer information comprised in first information, second information, third information and fourth information in the present application) is provided to the controller/processor 440. The controller/processor 440 provides functions of the L2 layer and above. In DL transmission, the controller/processor 440 provides header compression, encryption, packet segmentation and reordering, multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, higher-layer information comprised in the first information, the second information, the third information and the fourth information in the present application is generated in the controller/processor 440. The transmitting processor 415 performs various signal-processing functions used for the L1 layer (that is, PHY), including coding, interleaving, scrambling, modulating, power control/allocation, precoding and physical-layer control signaling generation, for example, the generation of physical-layer signals of the first information, the second information, the third information and the fourth information in the present application is completed at the transmitting processor 415, when there exists at least one control signaling candidate comprised in a target control signaling candidate set being used to transmit a control signaling, the generation of the transmitted control signaling is completed at the transmitting processor 415. The generated modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. At the receiving side, each receiver 456 receives an RF signal via a corresponding antenna 460, each receiver 456 recovers baseband information modulated to the RF carrier and provides the baseband information to the receiving processor 452. The receiving processor 452 performs various signal receiving functions used for the L1 layer. The signal receiving and processing function comprises receiving physical layer signals of the first information, the second information, the third information and the fourth information in the present disclosure and a monitoring performed on at least one control signaling candidate comprised in a target control signaling candidate set, demodulating multicarrier symbols in multicarrier symbol flows based on each modulation scheme (e.g., BPSK, QPSK), and then descrambling, decoding and de-interleaving of the demodulated symbols so as to recover data or control signal transmitted by the second node 410 on a physical channel, and then providing the data or control signal to the controller/processor 490. The controller/processor 490 is responsible for the L2 layer and layers above, and the controller/processor 490 interprets the first information, the second information, the third information and the fourth information in the present application. The controller/processor can be associated with a memory 480 that stores program code and data. The memory 480 may be called a computer readable medium.

In UL transmission, the data source/buffer 480 provides higher-layer data to the controller/processor 490. The data source/buffer 480 represents L2 layer and all protocol layers above the L2 layer. The controller/processor 490 implements the L2 layer protocols used for the user plane and the control plane by providing header compression, encryption, packet segmentation and reordering, as well as multiplexing between a logic channel and a transport channel through radio resources allocation based on the second node 410. The controller/processor 490 is also responsible for HARQ operation, retransmission of a lost packet, a signaling to the second node 410, and the fifth information in the present application is generated by the controller/processor 490. The transmitting processor 455 performs various signal transmitting processing functions used for the L1 layer (that is, PHY). A physical-layer signal carrying the fifth information is generated by the transmitting processor 455. The signal transmitting and processing function comprises sequence generation (for signals generated by a sequence), coding and interleaving to facilitate Forward Error Correction (FEC) at the UE 450 as well as modulation of baseband signals based on various modulation schemes (i.e., BPSK, QPSK), diving sequence-generated signals and modulated symbols into parallel streams and mapping each stream onto a corresponding multicarrier subcarrier and/or multicarrier symbol, which are later mapped from the transmitting processor 455 to the antenna 460 via the transmitter 456 to be transmitted in the form of RF signal. The receiver 416 receives a radio-frequency signal via a corresponding antenna 420, each resumes baseband information modulated onto the radio frequency carriers and provides the baseband information to the receiving processor 412. The receiving processor 412 performs various signal receiving and processing functions used for the L1 layer (i.e., PHY), comprising receiving and processing a physical layer signal carrying the fifth information in the present application, the signal receiving and processing function comprises acquiring multicarrier symbol flows, and demodulating multicarrier symbols within relative to sequence decorrelation and based on each modulation scheme (e.g., BPSK, QPSK), de-scrambling and de-interleaving to recover data or control signal originally transmitted by the first node 450 on a physical channel. The data and the control signal are then provided to the controller/processor 440. The controller/processor 440 performs functions of L2 layer, including reading the fifth information in the present application. The controller/processor can be associated with a buffer 430 that stores program code and data, and the buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives first information, the first information is used to determine a target cell, the target cell is used to schedule a characteristic cell, and the characteristic cell and the target cell belong to a same cell group; monitors at least one control signaling candidate comprised in a target control signaling candidate set, the target control signaling candidate set comprises at least one control signaling candidate; herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

In one embodiment, the first node 450 comprises a memory that stores a computer readable instruction program. The computer readable instruction program generates an action when executed by at least one processor. The action includes: receiving first information, the first information being used to determine a target cell, the target cell being used to schedule a characteristic cell, and the characteristic cell and the target cell belonging to a same cell group; monitoring at least one control signaling candidate comprised in a target control signaling candidate set, the target control signaling candidate set comprising at least one control signaling candidate; herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

In one embodiment, the second node 410 comprises at least one processor and at least one memory. The at least one memory comprises computer program codes; the at least one memory and the computer program codes are configured to be used in collaboration with the at least one processor. The second node 410 at least: transmits first information, the first information is used to indicate a target cell, the target cell is used to schedule a characteristic cell, and the characteristic cell and the target cell belong to the same cell group; determines at least one control signaling candidate comprised in a target control signaling candidate set, the target control signaling candidate set comprises at least one control signaling candidate; herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

In one embodiment, the second node 410 comprises a memory that stores a computer readable instruction program. The computer readable instruction program generates an action when executed by at least one processor. The action includes: transmitting first information, the first information being used to indicate a target cell, the target cell being used to schedule a characteristic cell, and the characteristic cell and the target cell belonging to a same cell group; determining at least one control signaling candidate comprised in a target control signaling candidate set, the target control signaling candidate set comprising at least one control signaling candidate; herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

In one embodiment, the first node 450 is a UE.

In one embodiment, the first node 450 is a UE supporting multicarrier transmission.

In one embodiment, the first node 450 is a UE supporting that an SCC cross-carrier schedules a PCC.

In one embodiment, the second node 410 is a base station (gNB/eNB).

In one embodiment, the second node 410 is a base station supporting multicarrier transmission.

In one embodiment, the second node 410 is a base station supporting that an SCC cross-carrier schedules a PCC.

In one embodiment, the receiver 456 (including the antenna 460), the receiving processor 452 and the controller/processor 490 are used to receive the first information in the present application.

In one embodiment, the receiver 456 (including the antenna 460), the receiving processor 452 and the controller/processor 490 are used to receive the second information in the present application.

In one embodiment, the receiver 456 (including the antenna 460), the receiving processor 452 and the controller/processor 490 are used to receive the third information in the present application.

In one embodiment, the receiver 456 (including the antenna 460), the receiving processor 452 and the controller/processor 490 are used to receive the fourth information in the present application.

In one embodiment, the transmitter 456 (including the antenna 460), the transmitting processor 455 and the controller/processor 490 are to transmit the fifth information in the present application.

In one embodiment, the transmitter 416 (including the antenna 420), the transmitting processor 415 and the controller/processor 440 are used to transmit the first information in the present application.

In one embodiment, the transmitter 416 (including the antenna 420), the transmitting processor 415 and the controller/processor 440 are used to transmit the second information in the present application.

In one embodiment, the transmitter 416 (including the antenna 420), the transmitting processor 415 and the controller/processor 440 are used to transmit the third information in the present application.

In one embodiment, the transmitter 416 (including the antenna 420), the transmitting processor 415 and the controller/processor 440 are used to transmit the fourth information in the present application.

In one embodiment, the receiver 416 (including the antenna 420), the receiving processor 412 and the controller/processor 440 are used to receive the fifth information in the present application.

Embodiment 5

Figure 5:
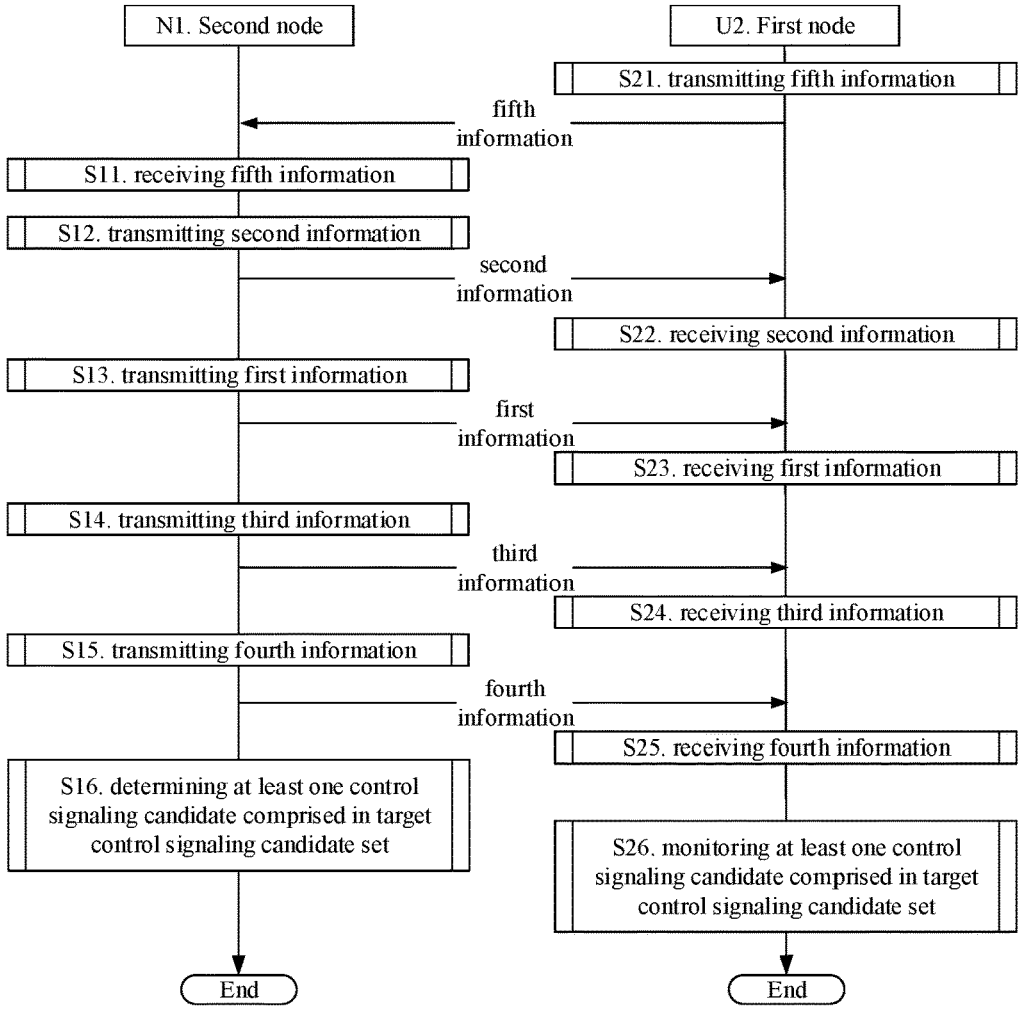
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a second node N1 is a maintenance base station of a serving cell of a first node U2. It is particularly underlined that the order illustrated in the embodiment does not put constraints over sequences of signal transmissions and implementations.

The second node N1 receives fifth information in step S11, transmits second information in step S12, transmits first information in step S13, transmits third information in step S14, transmits fourth information in step S15, and determines at least one control signaling candidate comprised in a target control signaling candidate set in step S16.

The first node U2 transmits fifth information in step S21, receives second information in step S22, receives first information in step S23, receives third information in step S24, receives fourth information in step S25, and monitors at least one control signaling candidate comprised in a target control signaling candidate set in step S26.

In embodiment 5, the first information is used to determine a target cell, the target cell is used to schedule a characteristic cell, and the characteristic cell and the target cell belong to a same cell group; the target control signaling candidate set comprises at least one control signaling candidate; a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer; the second information is used to determine a configuration cell group, and the configuration cell group comprises multiple serving cells; the target cell belongs to the configuration cell group, the characteristic cell belongs to the configuration cell group, and the characteristic cell is a PCell in the configuration cell group; a scheduled cell set comprises a serving cell scheduled by a serving cell comprised in the scheduling cell set, and the scheduled cell set comprises at least one serving cell; any serving cell comprised in the scheduling cell set belongs to the configuration cell group, and any serving cell comprised in the scheduled cell set belongs to the configuration cell group; a target proportional value is used to determine the first threshold value, the target proportional value is a positive number not greater than 1, and the target proportional value is equal to one of a first proportional value or a second proportional value; the first proportional value is equal to a ratio of a first sum value and a first characteristic sum value, and the second proportional value is equal to a ratio of the second sum value and a second characteristic sum value; the first sum value is a positive number, the first characteristic sum value is a positive number not less than the first sum value, the second sum value is a positive number, the second characteristic sum value is a positive number not less than the second sum value, and the first proportional value and the second proportional value are not equal; at least one of whether the scheduling cell set comprises the target cell or whether the characteristic cell is the same as the target cell is used to determine the target proportional value between the first proportional value and the second proportional value; the third information is used to determine a first cell subset and a second cell subset; the fourth information is used to determine a second factor; the fifth information is used to indicate a first capability parameter, and the first capability parameter is a positive integer; the first capability parameter is used to determine the first threshold value.

In one embodiment, the second information is transmitted via an air interface.

In one embodiment, the second information is transmitted via a radio interface.

In one embodiment, the second information is transmitted via a higher-layer signaling.

In one embodiment, the second information is transmitted via a physical-layer signaling.

In one embodiment, the second information comprises all or part of a higher-layer signaling.

In one embodiment, the second information comprises all or part of a physical-layer signaling.

In one embodiment, the second information comprises all or partial IEs in an RRC signaling.

In one embodiment, the second information comprises all or partial fields in an IE in an RRC signaling.

In one embodiment, the second information comprises all or part of a MAC-layer signaling.

In one embodiment, the second information comprises all or part of a System Information Block (SIB).

In one embodiment, the second information is transmitted through a DL-SCH.

In one embodiment, the second information is transmitted through a PDSCH.

In one embodiment, the second information is cell-specific.

In one embodiment, the second information is UE-specific.

In one embodiment, the second information is carrier-specific.

In one embodiment, the second information is configured per carrier.

In one embodiment, the second information is serving cell-specific.

In one embodiment, the second information is configured per serving cell.

In one embodiment, the second information comprises all or partial fields of a DCI signaling.

In one embodiment, the second information belongs to an IE "CellGroupConfig" in an RRC signaling.

In one embodiment, the second information belongs to a field "sCellToAddModList" in an IE "CellGroupConfig" in an RRC signaling.

In one embodiment, the second information belongs to a field "sCellToReleaseList" in an IE "CellGroupConfig" in an RRC signaling.

In one embodiment, the second information and the first information are carried by two different RRC signalings.

In one embodiment, the second information and the first information are carried by a same RRC signaling.

In one embodiment, the second information and the first information are carried by two different IEs in a same RRC signaling.

In one embodiment, the second information and the first information are carried by two different fields in a same IE in a same RRC signaling.

In one embodiment, the above phrase of "the second information being used to determine a configuration cell group" comprises the following meaning: the second information is used by the first node in the present application to determine the configuration cell group.

In one embodiment, the above phrase of "the second information being used to determine a configuration cell group" comprises the following meaning: the second information is used to explicitly indicate the configuration cell group.

In one embodiment, the above phrase of "the second information being used to determine a configuration cell group" comprises the following meaning: the second information is used to implicitly indicate the configuration cell group.

In one embodiment, the above phrase of "the second information being used to determine a configuration cell group" comprises the following meaning: the second information is used to indirectly indicate the configuration cell group.

In one embodiment, the third information is transmitted via an air interface.

In one embodiment, the third information is transmitted via a radio interface.

In one embodiment, the third information is transmitted via a higher-layer signaling.

In one embodiment, the third information is transmitted via a physical-layer signaling.

In one embodiment, the third information comprises all or part of a higher-layer signaling.

In one embodiment, the third information comprises all or part of a physical-layer signaling.

In one embodiment, the third information comprises all or partial IEs in an RRC signaling.

In one embodiment, the third information comprises all or partial fields in an IE in an RRC signaling.

In one embodiment, the third information comprises all or part of a MAC layer signaling.

In one embodiment, the third information comprises all or part of an SIB.

In one embodiment, the third information is transmitted through a DL-SCH.

In one embodiment, the third information is transmitted through a PDSCH.

In one embodiment, the third information is cell-specific.

In one embodiment, the third information is UE-specific.

In one embodiment, the third information is carrier group-specific.

In one embodiment, the third information is cell group-specific.

In one embodiment, the third information is carrier-specific.

In one embodiment, the third information is serving cell-specific.

In one embodiment, the third information comprises all or partial fields of a DCI signaling.

In one embodiment, the third information comprises a field "CORESETPoolIndex" in an IE "ControlResource Set" in an IE "PDCCH-Config" in an RRC signaling.

In one embodiment, the third information comprises an IE "PDCCH-Config" in an RRC signaling.

In one embodiment, the third information comprises an IE "ControlResource Set" in an IE "PDCCH-Config" in an RRC signaling.

In one embodiment, the third information and the first information are carried by two different RRC signalings.

In one embodiment, the third information and the first information are carried by a same RRC signaling.

In one embodiment, the third information and the first information are carried by two different IEs in a same RRC signaling.

In one embodiment, the third information and the first information are carried by two different fields in a same IE in a same RRC signaling.

In one embodiment, the second information and the third information are carried by two different RRC signalings.

In one embodiment, the second information and the third information are carried by a same RRC signaling.

In one embodiment, the second information and the third information are carried by two different IEs in a same RRC signaling.

In one embodiment, the second information and the third information are carried by two different fields in a same IE in a same RRC signaling.

In one embodiment, the above phrase of "the third information being used to determine a first cell subset and a second cell subset" comprises the following meaning: the third information is used by the first node in the present application to determine the first cell subset and the second cell subset.

In one embodiment, the above phrase of "the third information being used to determine a first cell subset and a second cell subset" comprises the following meaning: the third information is used to determine a CORESET Pool Index provided for each serving cell comprised in the first cell subset, and a CORESET Pool Index provided for each serving cell comprised in the first cell subset is equal; the third information is used to determine a CORESET Pool Index provided for each serving cell comprised in the second cell subset, and a CORESET Pool Index provided for each serving cell comprised in the second cell subset is equal.

In one embodiment, the above phrase of "the third information being used to determine a first cell subset and a second cell subset" comprises the following meaning: the third information is used to determine a number of CORESET(s) provided for each serving cell comprised in the first cell subset, and a number of CORESET(s) provided for each serving cell comprised in the first cell subset is equal; the third information is used to determine a number of CORESET(s) provided for each serving cell comprised in the second cell subset, and a number of CORESET(s) provided for each serving cell comprised in the second cell subset is equal.

In one embodiment, the above phrase of "the third information being used to determine a first cell subset and a second cell subset" comprises the following meaning: the third information comprises P sub-information blocks, and P is equal to a sum of a number of serving cell(s) comprised in the first cell subset and a number of serving cell(s) comprised in the second cell subset; the P sub-information blocks are respectively for P serving cells comprised in the first cell subset and the second cell subset; any of the P sub-information blocks is used to determine a CORESET provided for a corresponding serving cell in the P serving cells; a number of CORESET(s) provided for each serving cell comprised in the first cell subset is equal, and a number of CORESET(s) provided for each serving cell comprised in the second cell subset is equal.

In one embodiment, the above phrase of "the third information being used to determine a first cell subset and a second cell subset" comprises the following meaning: the third information comprises P sub-information blocks, and P is equal to a sum of a number of serving cell(s) comprised in the first cell subset and a number of serving cell(s) comprised in the second cell subset; the P sub-information blocks are respectively for P serving cells comprised in the first cell subset and the second cell subset; any of the P sub-information blocks is used to determine a CORESET Pool Index provided for a corresponding serving cell in the P serving cells; a CORESET Pool Index provided for each serving cell comprised in the first cell subset is equal to "0", and a CORESET Pool Index provided for each serving cell comprised in the second cell subset is equal to "1".

In one embodiment, the third information comprises P sub-information blocks, and P is equal to a sum of a number of serving cell(s) comprised in the first cell subset and a number of serving cell(s) comprised in the second cell subset; the P sub-information blocks are respectively for P serving cells comprised in the first cell subset and the second cell subset.

In one embodiment, the fourth information is transmitted via an air interface.

In one embodiment, the fourth information is transmitted via a radio interface.

In one embodiment, the fourth information is transmitted via a higher-layer signaling.

In one embodiment, the fourth information is transmitted via a physical-layer signaling.

In one embodiment, the fourth information comprises all or part of a higher-layer signaling.

In one embodiment, the fourth information comprises all or part of a physical-layer signaling.

In one embodiment, the fourth information comprises all or part of an RRC signaling.

In one embodiment, the fourth information comprises all or part of a MAC layer signaling.

In one embodiment, the fourth information is transmitted through a DL-SCH.

In one embodiment, the fourth information is transmitted through a PDSCH.

In one embodiment, the fourth information is UE-specific.

In one embodiment, the fourth information is carrier-specific.

In one embodiment, the fourth information is configured per carrier.

In one embodiment, the fourth information is serving cell-specific.

In one embodiment, the fourth information is configured per serving cell.

In one embodiment, the fourth information comprises all or partial fields of a DCI signaling.

In one embodiment, the third information and the fourth information are carried by two different RRC signalings.

In one embodiment, the third information and the fourth information are carried by a same RRC signaling.

In one embodiment, the third information and the fourth information are carried by two different IEs in a same RRC signaling.

In one embodiment, the third information and the fourth information are carried by two different fields in a same IE in a same RRC signaling.

In one embodiment, the above phrase "the fourth information being used to determine a second factor" comprises the following meaning: the fourth information is used by the first node in the present application to determine the second factor.

In one embodiment, the above phrase "the fourth information being used to determine a second factor" comprises the following meaning: the fourth information is used to explicitly indicate the second factor.

In one embodiment, the above phrase "the fourth information being used to determine a second factor" comprises the following meaning: the fourth information is used to implicitly indicate the second factor.

In one embodiment, the above phrase "the fourth information being used to determine a second factor" comprises the following meaning: the fourth information is used to indirectly indicate the second factor.

In one embodiment, "the fourth information being used to determine a second factor" is implemented based on claim 8 in the present application.

Embodiment 6

Figure 6:
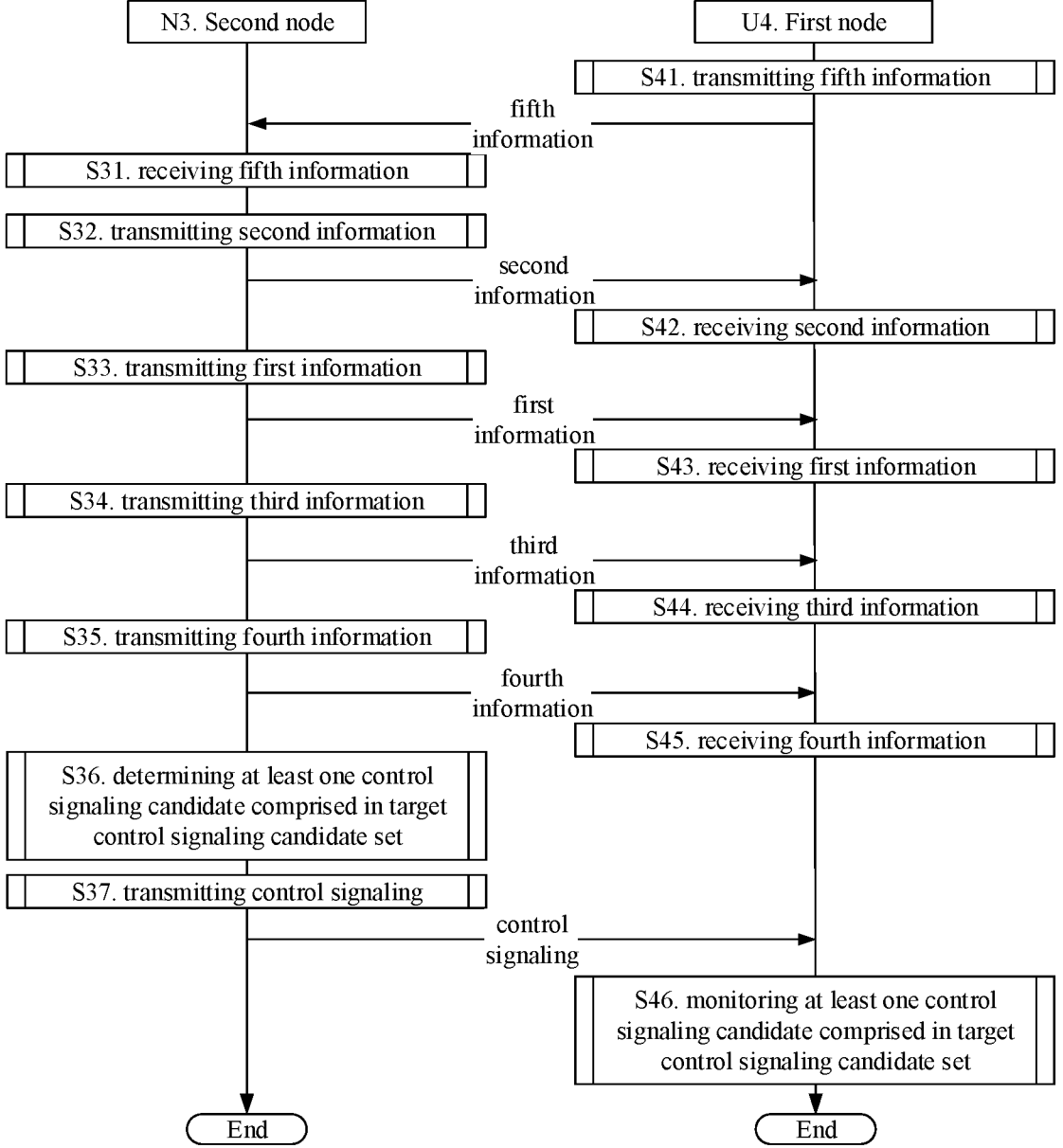
FIG. 6 illustrates a flowchart of radio signal transmission according to another embodiment of the present application.

Embodiment 6 illustrates a flowchart of radio signal transmission according to another embodiment of the present application, as shown in FIG. 6. In FIG. 6, a second node N3 is a maintenance base station of a serving cell of a first node U4. It is particularly underlined that the order illustrated in the embodiment does not put constraints over sequences of signal transmissions and implementations.

The second node N3 receives fifth information in step S31, transmits second information in step S32, transmits first information in step S33, transmits third information in step S34, transmits fourth information in step S35, determines at least one control signaling candidate comprised in a target control signaling candidate set in step S36, and transmits a control signaling in step S37.

The first node U4 transmits fifth information in step S41, receives second information in step S42, receives first information in step S43, receives third information in step S44, receives fourth information in step S45, and monitors at least one control signaling candidate comprised in a target control signaling candidate set in step S46.

In embodiment 6, the first information is used to determine a target cell, the target cell is used to schedule a characteristic cell, and the characteristic cell and the target cell belong to a same cell group; the target control signaling candidate set comprises at least one control signaling candidate; a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer; the second information is used to determine a configuration cell group, and the configuration cell group comprises multiple serving cells; the target cell belongs to the configuration cell group, the characteristic cell belongs to the configuration cell group, and the characteristic cell is a PCell in the configuration cell group; a scheduled cell set comprises a serving cell scheduled by a serving cell comprised in the scheduling cell set, and the scheduled cell set comprises at least one serving cell; any serving cell comprised in the scheduling cell set belongs to the configuration cell group, and any serving cell comprised in the scheduled cell set belongs to the configuration cell group; a target proportional value is used to determine the first threshold value, the target proportional value is a positive number not greater than 1, and the target proportional value is equal to one of a first proportional value or a second proportional value; the first proportional value is equal to a ratio of a first sum value and a first characteristic sum value, and the second proportional value is equal to a ratio of the second sum value and a second characteristic sum value; the first sum value is a positive number, the first characteristic sum value is a positive number not less than the first sum value, the second sum value is a positive number, the second characteristic sum value is a positive number not less than the second sum value, and the first proportional value and the second proportional value are not equal; at least one of whether the scheduling cell set comprises the target cell or whether the characteristic cell is the same as the target cell is used to determine the target proportional value between the first proportional value and the second proportional value; the third information is used to determine a first cell subset and a second cell subset; the fourth information is used to determine a second factor; the fifth information is used to indicate a first capability parameter, and the first capability parameter is a positive integer; the first capability parameter is used to determine the first threshold value; the control signaling occupies a control signaling candidate comprised in the target control signaling candidate set.

In one embodiment, the fifth information is transmitted via an air interface.

In one embodiment, the fifth information is transmitted via a radio interface.

In one embodiment, the fifth information is transmitted via a higher-layer signaling.

In one embodiment, the fifth information is transmitted via a physical-layer signaling.

In one embodiment, the fifth information comprises all or part of a higher-layer signaling.

In one embodiment, the fifth information comprises all or part of a physical-layer signaling.

In one embodiment, the fifth information comprises all or part of an RRC signaling.

In one embodiment, the fifth information comprises all or part of a MAC-layer signaling.

In one embodiment, the fifth information is transmitted through a UL-SCH.

In one embodiment, the fifth information is transmitted through a PUSCH.

In one embodiment, the fifth information is UE-specific.

In one embodiment, the fifth information is carrier-specific.

In one embodiment, the fifth information is used to indicate a capability of the first node in the present application.

In one embodiment, the fifth information is used to indicate a CA or DC capability of the first node in the present application.

In one embodiment, the fifth information is used to indicate a blind detection capability of the first node in the present application.

In one embodiment, the fifth information comprises an IE "Phy-Parameters".

In one embodiment, the fifth information comprises a field "pdcch-BlindDetectionCA-r16" in an IE "Phy-Parameters".

In one embodiment, the fifth information comprises a field "pdcch-BlindDetectionCA-r15" in an IE "Phy-Parameters".

In one embodiment, the fifth information comprises a field "pdcch-BlindDetectionCA-r17" in an IE "Phy-Parameters".

In one embodiment, the fifth information comprises a field "pdcch-BlindDetectionCA" in an IE "Phy-Parameters".

In one embodiment, the fifth information comprises a field "pdcch-BlindDetectionNRDC" in an IE "Phy-Parameters".

In one embodiment, the fifth information comprises a field "pdcch-BlindDetectionMCG-UE" in an IE "Phy-Parameters".

In one embodiment, the fifth information comprises a field "pdcch-BlindDetectionSCG-UE" in an IE "Phy-Parameters".

In one embodiment, the above phrase of "the fifth information being used to indicate a first capability parameter" comprises the following meaning: the fifth information is used by the first node in the present application to indicate the first capability parameter.

In one embodiment, the above phrase of "the fifth information being used to indicate a first capability parameter" comprises the following meaning: the fifth information is used to explicitly indicate the first capability parameter.

In one embodiment, the above phrase of "the fifth information being used to indicate a first capability parameter" comprises the following meaning: the fifth information is used to implicitly indicate the first capability parameter.

In one embodiment, the above phrase of "the fifth information being used to indicate a first capability parameter" comprises the following meaning: the fifth information is used to indirectly indicate the first capability parameter.

In one embodiment, the first capability parameter is a number of serving cell(s) with a maximum number of Blind Decoding(s) that can be supported by the first node.

In one embodiment, the first capability parameter is a number of serving cell(s) with a maximum number of Blind Decoding(s) that can be supported by the first node in a cell group.

In one embodiment, the first capability parameter is a number of serving cell(s) with a maximum number of Blind Decoding(s) that can be supported by the first node in an MCG.

In one embodiment, the first capability parameter is a number of serving cell(s) with a maximum number of Blind Decoding(s) that can be supported by the first node in an SCG.

In one embodiment, the first capability parameter is a number of serving cell(s).

In one embodiment, the above phrase of "the first capability parameter being used to determine the first threshold value" comprises the following meaning: the target value in the present application is proportional to the first capability parameter.

In one embodiment, the above phrase of "the first capability parameter being used to determine the first threshold value" comprises the following meaning: the first threshold value is proportional to the first capability parameter.

In one embodiment, the above phrase of "the first capability parameter being used to determine the first threshold value" comprises the following meaning: the first capability parameter, the target proportional value in the present application and the first parameter in the present application are used together to determine the first threshold value.

In one embodiment, the above phrase of "the first capability parameter being used to determine the first threshold value" comprises the following meaning: the first capability parameter, the target proportional value in the present application and the first parameter in the present application are used together to determine the target value in the present application.

In one embodiment, the above phrase of "the first capability parameter being used to determine the first threshold value" comprises the following meaning: a product of the first capability parameter, the target proportional value in the present application and the first parameter in the present application is equal to the target value in the present application.

In one embodiment, the above phrase of "the first capability parameter being used to determine the first threshold value" is implemented by the following formula:

$$M_{PDCCH}^{total,slot,\mu} = \left\lfloor N_{cells}^{cap} \cdot M_{PDCCH}^{max,slot,\mu} \cdot P_{cells}^{DL,\mu} \right\rfloor$$

herein, $$M_{PDCCH}^{total,slot,\mu}$$

represents the first threshold value, $$N_{cells}^{cap} \cdot M_{PDCCH}^{max,slot,\mu} \cdot P_{cells}^{DL,\mu}$$

represents the target value, $$M_{PDCCH}^{max,slot,\mu}$$

represents the first parameter, $$P_{cells}^{DL,\mu}$$

represents the target proportional value in the present application, $$N_{cells}^{cap}$$

represents the first capability parameter in the present application, and $\mu$ represents an index of the first SCS.

In one embodiment, a number of serving cell(s) comprised in the configuration cell group in the present application is greater than the first capability parameter.

In one embodiment, a number of serving cell(s) comprised in the configuration cell group in the present application is equal to the first capability parameter.

In one embodiment, a number of serving cell(s) comprised in the configuration cell group in the present application is less than the first capability parameter.

In one embodiment, a number of serving cell(s) comprised in the scheduled cell set in the present application is greater than the first capability parameter.

In one embodiment, a number of serving cell(s) comprised in the scheduled cell set in the present application is equal to the first capability parameter.

In one embodiment, a number of serving cell(s) comprised in the scheduled cell set in the present application is less than the first capability parameter.

In one embodiment, a sum number of a product between the second number in the present application and the first factor in the present application plus the first number in the present application is greater than the first capability parameter.

In one embodiment, a sum number of a product between the second number in the present application and the first factor in the present application plus the first number in the present application is equal to the first capability parameter.

In one embodiment, a sum number of a product between the second number in the present application and the first factor in the present application plus the first number in the present application is less than the first capability parameter.

Embodiment 7

Figure 7:
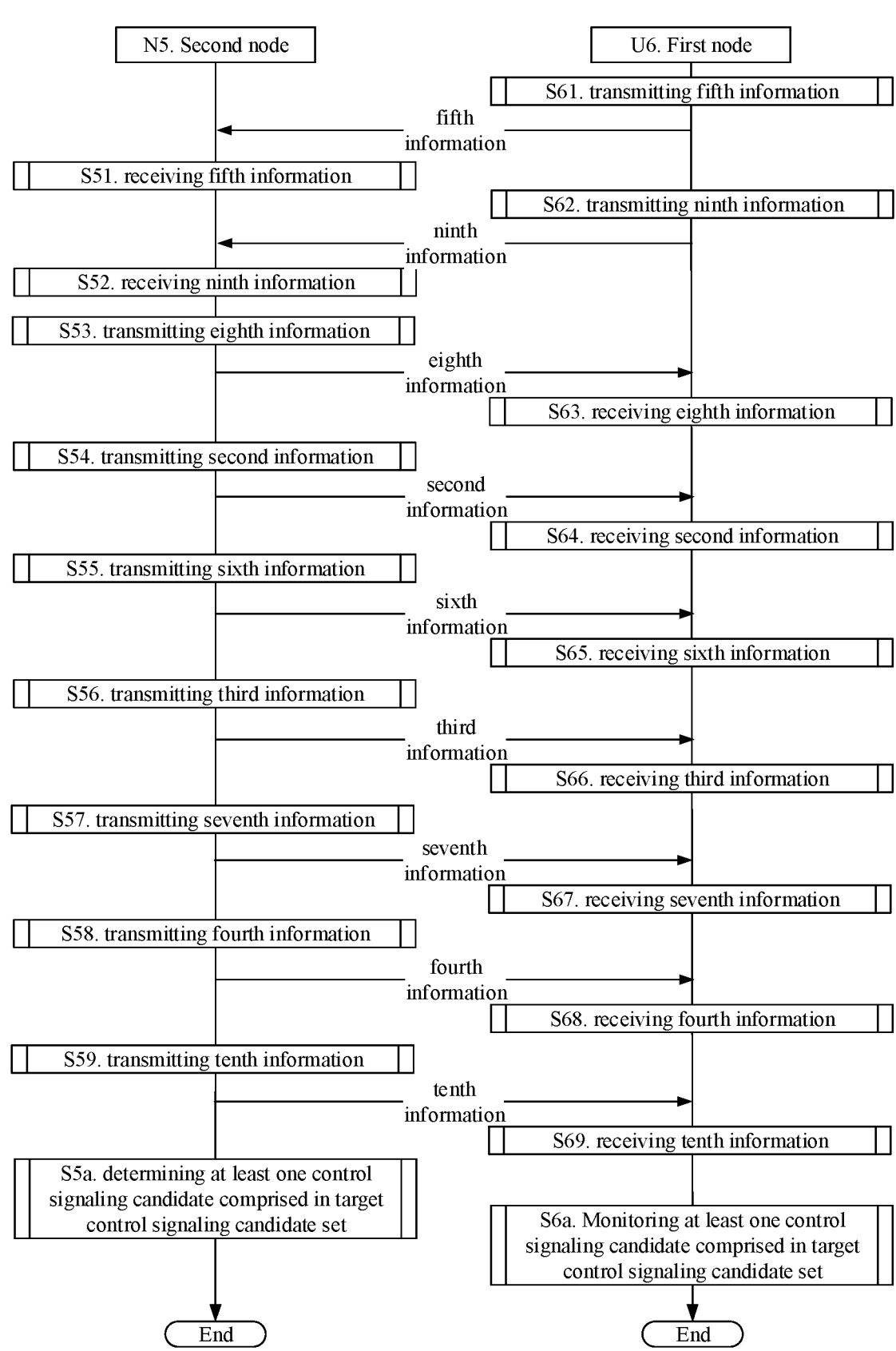
FIG. 7 illustrates a flowchart of radio signal transmission according to another embodiment of the present application.

Embodiment 7 illustrates a flowchart of radio signal transmission according to another embodiment in the present application, as shown in FIG. 7. In FIG. 7, a second node N5 is a maintenance base station of a serving cell of a first node U6. It is particularly underlined that the order illustrated in the embodiment does not put constraints over sequences of signal transmissions and implementations.

The second node N5 receives fifth information in step S51, receives ninth information in step S52, transmits eighth information in step S53, transmits second information in step S54, transmits sixth information in step S55, transmits third information in step S56, transmits seventh information in step S57, transmits fourth information in step S58, transmits tenth information in step S59, determines at least one control signaling candidate comprised in a target control signaling candidate set in step S5a.

The first node U6 transmits fifth information in step S61, transmits ninth information in step S62, receives eighth information in step S63, receives second information in step S64, receives sixth information in step S65, receives third information in step S66, receives seventh information in step S67, receives fourth information in step S68, receives tenth information in step S69, and monitors at least one control signaling candidate comprised in a target control signaling candidate set in step S6a.

In one embodiment, the sixth information is used to determine an SCS of a subcarrier in each sub-band in the first sub-band set in the present application and in each sub-band in the first sub-band set.

In one embodiment, the seventh information is used to determine time-frequency resources occupied by each control signaling candidate in the target control signaling candidate set in the present application.

In one embodiment, the seventh information is used to determine a sub-band in the first sub-band set in the present application to which time-frequency resources occupied by each control signaling candidate in the target control signaling candidate set in the present application belong.

In one embodiment, the eighth information is used to indicate the first factor in the present application.

In one embodiment, the ninth information is used to indicate the first factor in the present application.

In one embodiment, the tenth information is used to indicate a difference value between the second characteristic sum value in the present application and the first characteristic sum value in the present application.

Embodiment 8

Figure 8:
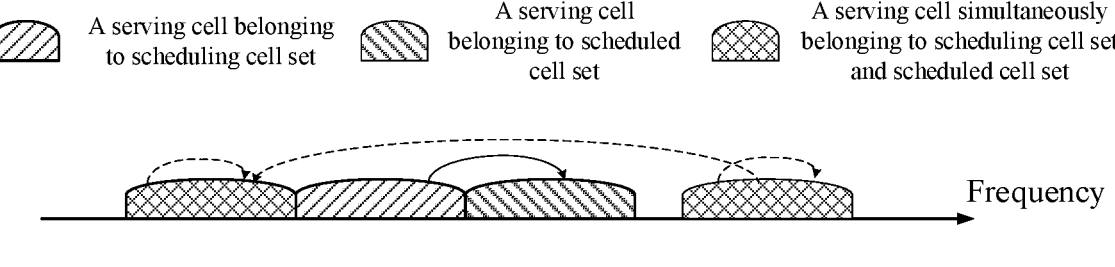
FIG. 8 illustrates a schematic diagram of a relation between a scheduling cell set and a scheduled cell set according to one embodiment of the present application.

Embodiment 8 illustrates a schematic diagram of a relation between a scheduling cell set and a scheduled cell set according to one embodiment of the present application, as shown in FIG. 8. In FIG. 8, the horizontal axis represents frequency, each filled block with an arc top represents a serving cell comprised in a configuration cell group, each left-slash (on top-down perspective) filled block with an arc top represents a serving cell comprised in a scheduling cell set, each right-slash (on top-down perspective) filled block with an arc top represents a serving cell comprised in a scheduled cell set, each cross-line-filled block with an arc top represents a serving cell belonging to both a scheduling cell set and a scheduled cell set, and the dotted arc with an arrow represents a scheduling and scheduled relationship between two serving cells.

In embodiment 8, the configuration cell group in the present application comprises multiple serving cells; the target cell in the present application belongs to the configuration cell group, the characteristic cell in the present application belongs to the configuration cell group, and the characteristic cell is a PCell in the configuration cell group; a scheduled cell set comprises a serving cell scheduled by a serving cell comprised in the scheduling cell set in the present application, and the scheduled cell set comprises at least one serving cell; any serving cell comprised in the scheduling cell set belongs to the configuration cell group, and any serving cell comprised in the scheduled cell set belongs to the configuration cell group.

In one embodiment, the configuration cell group is an MCG.

In one embodiment, the configuration cell group is an SCG.

In one embodiment, the configuration cell group comprises a MAC entity, a set of logical channels associated with RLC entities and a set comprising a PCell and one or multiple Scells.

In one embodiment, the target cell is a serving cell comprised in the configuration cell group.

In one embodiment, the configuration cell group comprises the target cell.

In one embodiment, the characteristic cell is a serving cell comprised in the configuration cell group.

In one embodiment, the configuration cell group comprises the characteristic cell.

In one embodiment, the target cell is a PCell comprised in the configuration cell group.

In one embodiment, the target cell is an Spcell comprised in the configuration cell group.

In one embodiment, the target cell is an SCell comprised in the configuration cell group.

In one embodiment, the above phrase of "the characteristic cell being a PCell in the configuration cell group" comprises the following meaning: when the configuration cell group is an MCG, the characteristic cell is a PCell in the configuration cell group; when the configuration cell group is an SCG, the characteristic cell is a Primary SCG Cell (PSCell) in the configuration cell group.

In one embodiment, the above phrase of "the characteristic cell being a PCell in the configuration cell group" comprises the following meaning: the characteristic cell is a Special Cell (Spcell) comprised in the configuration cell group.

In one embodiment, the above phrase of "the characteristic cell being a PCell in the configuration cell group" comprises the following meaning: the characteristic cell is a serving cell comprised in the configuration cell group and used by the first node in the present application for executing an initial connection establishment procedure or initiating a connection re-establishment procedure.

In one embodiment, the above phrase of "the characteristic cell being a PCell in the configuration cell group"

comprises the following meaning: the characteristic cell is a serving cell comprised in the configuration cell group and used by the first node in the present application for a random access when executing a Reconfiguration with Sync procedure.

In one embodiment, the above phrase of "a scheduled cell set comprises a serving cell scheduled by a serving cell comprised in the scheduling cell set" comprises the following meaning: the scheduled cell set comprises all serving cells scheduled by any serving cell comprised in the scheduling cell set.

In one embodiment, the above phrase of "a scheduled cell set comprises a serving cell scheduled by a serving cell comprised in the scheduling cell set" comprises the following meaning: the scheduled cell set only comprises a serving cell scheduled by a serving cell comprised in the scheduling cell set.

In one embodiment, the above phrase of "a scheduled cell set comprises a serving cell scheduled by a serving cell comprised in the scheduling cell set" comprises the following meaning: any serving cell scheduled by a serving cell comprised in the scheduling cell set belongs to the scheduled cell set.

In one embodiment, the above phrase of "a scheduled cell set comprises a serving cell scheduled by a serving cell comprised in the scheduling cell set" comprises the following meaning: any serving cell scheduled by a serving cell comprised in the scheduling cell set consists of the scheduled cell set.

In one embodiment, the above phrase of "a scheduled cell set comprises a serving cell scheduled by a serving cell comprised in the scheduling cell set" comprises the following meaning: the scheduling cell set comprises a scheduling cell of any serving cell comprised in the scheduled cell set.

In one embodiment, a serving cell comprised in the scheduling cell set scheduling a serving cell comprised in the scheduled cell refers to: a PDCCH transmitted on a serving cell comprised in the scheduling cell set schedules a serving cell comprised in the scheduled cell.

In one embodiment, a serving cell comprised in the scheduling cell set scheduling a serving cell comprised in the scheduled cell refers to: a PDCCH transmitted on a serving cell comprised in the scheduling cell set schedules a signal transmitted on a serving cell comprised in the scheduled cell.

In one embodiment, when the scheduling cell set comprises the target cell, the scheduled cell set comprises the characteristic cell.

In one embodiment, when the target cell belongs to the scheduling cell set, the characteristic cell belongs to the scheduled cell set.

In one embodiment, any serving cell comprised in the scheduling cell set is a serving cell comprised in the configuration cell group.

In one embodiment, any serving cell comprised in the scheduled cell set is a serving cell comprised in the configuration cell group.

Embodiment 9

Figure 9:
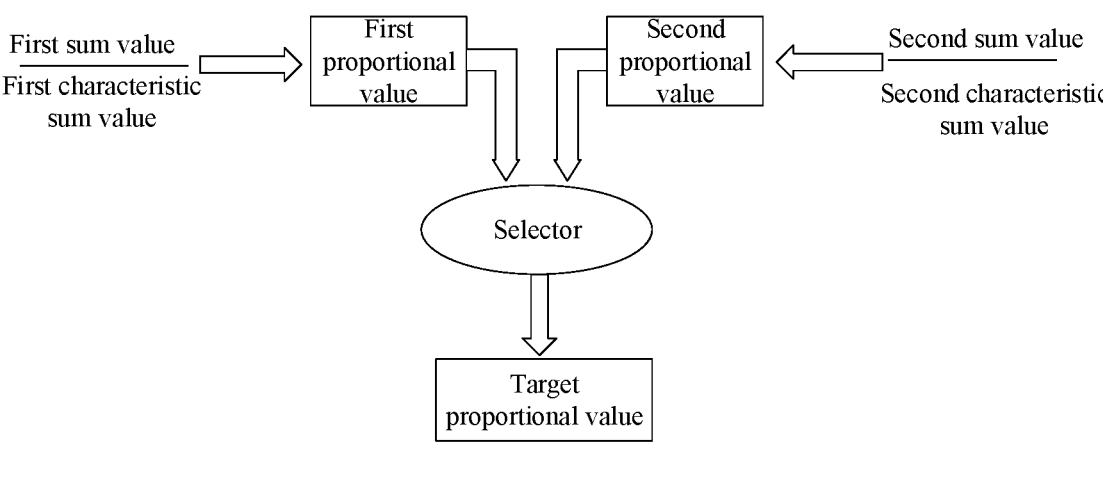
FIG. 9 illustrates a schematic diagram of a target proportional value according to one embodiment of the present application.

Embodiment 9 illustrates a schematic diagram of a target proportional value according to one embodiment of the present application, as shown in FIG. 9. In FIG. 9, each rectangle represents one of a first proportional value, a second proportional value or a target proportional value, and the arrow represents the calculation procedure.

In embodiment 9, a target proportional value is used to determine the first threshold value in the present application, the target proportional value is a positive number not greater than 1, and the target proportional value is equal to one of a first proportional value or a second proportional value; the first proportional value is equal to a ratio of a first sum value and a first characteristic sum value, and the second proportional value is equal to a ratio of the second sum value and a second characteristic sum value; the first sum value is a positive number, the first characteristic sum value is a positive number not less than the first sum value, the second sum value is a positive number, the second characteristic sum value is a positive number not less than the second sum value, and the first proportional value and the second proportional value are not equal; at least one of whether the scheduling cell set in the present application comprises the target cell in the present application or whether the characteristic cell in the present application and the target cell are the same is used to determine the target proportional value between the first proportional value and the second proportional value.

In one embodiment, the target proportional value may be equal to 1.

In one embodiment, the target proportional value is greater than 0.

In one embodiment, the target proportional value is less than 1.

In one embodiment, the target proportional value may be equal to 1.

In one embodiment, the first proportional value is greater than 0.

In one embodiment, the first proportional value is less than 1.

In one embodiment, the second proportional value may be equal to 1.

In one embodiment, the second proportional value is greater than 0.

In one embodiment, the second proportional value is less than 1.

In one embodiment, the above phrase of "a target proportional value being used to determine the first threshold value" comprises the following meaning: the target value in the present application is proportional to the target proportional value.

In one embodiment, the above phrase of "a target proportional value being used to determine the first threshold value" comprises the following meaning: the target proportional value is used by the first node in the present application to determine the target proportional value.

In one embodiment, the above phrase of "a target proportional value being used to determine the first threshold value" comprises the following meaning: the first threshold value is proportional to the target proportional value.

In one embodiment, the above phrase of "a target proportional value being used to determine the first threshold value" comprises the following meaning: the first threshold value is obtained after the target proportional value is through operational function.

In one embodiment, the above phrase of "a target proportional value being used to determine the first threshold value" comprises the following meaning: the target proportional value is used to determine an intermediate value, and the first threshold value is equal to the intermediate value rounded down to an integer.

In one embodiment, the above phrase of "a target proportional value being used to determine the first threshold value" comprises the following meaning: the target proportional value in the present application is used to determine the target value in the present application.

In one embodiment, the above phrase of "the target proportional value being equal to a first proportional value and a second proportional value" comprises the following meaning: the target proportional value is equal to the first proportional value, or the target proportional value is equal to the second proportional value.

In one embodiment, the above phrase of "the target proportional value being equal to a first proportional value and a second proportional value" comprises the following meaning: the target proportional value may be equal to the first proportional value.

In one embodiment, the above phrase of "the target proportional value being equal to a first proportional value and a second proportional value" comprises the following meaning: the target proportional value may be equal to the second proportional value.

In one embodiment, the first sum value is equal to the second sum value.

In one embodiment, the first sum value is not equal to the second sum value.

In one embodiment, the first characteristic sum value is equal to the second characteristic sum value.

In one embodiment, the first characteristic sum value and the second characteristic sum value are not equal.

In one embodiment, the first characteristic sum value is greater than the first sum value.

In one embodiment, the first characteristic sum value is equal to the first sum value.

In one embodiment, the second characteristic sum value is greater than the second sum value.

In one embodiment, the second characteristic sum value is equal to the second sum value.

In one embodiment, the first proportional value is greater than the second proportional value.

In one embodiment, the first proportional value is less than the second proportional value.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: whether the scheduling cell set comprises the target cell and whether the characteristic cell is the same as the target cell are used together to determine the target proportional value between the first proportional value and the second proportional value.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: whether the scheduling cell set comprises the target cell is used to determine the target proportional value between the first proportional value and the second proportional value.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: whether the characteristic cell is the same as the target cell is used to determine the target proportional value between the first proportional value and the second proportional value.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: at least one of whether the scheduled cell set comprises the target cell or whether the characteristic cell is the same as the target cell is used by the first node in the present application to determine the target proportional value between the first proportional value and the second proportional value.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: at least one of whether the scheduling cell set comprises the target cell or whether the characteristic cell is the same as the target cell is used to determine the target proportional value between the first proportional value and the second proportional value according to judgment condition.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: when the characteristic cell is the same as the target cell, the target proportional value is equal to the first proportional value; when the characteristic cell and the target cell are not the same and the scheduling cell set does not comprise the target cell, the target proportional value is equal to the first proportional value; when the characteristic cell and the target cell are not the same and the scheduling cell set comprises the target cell, the target proportional value is equal to the second proportional value.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: when the characteristic cell is the same as the target cell, the target proportional value is equal to the first proportional value; when the characteristic cell is not the same as the target cell, the target proportional value is equal to the second proportional value.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: when the scheduling cell set does not comprise the target cell, the target proportional value is equal to the first proportional value; when the scheduling cell set comprises the target cell, the target proportional value is equal to the second proportional value.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: at least one of whether the scheduling cell set comprises the target cell or whether the characteristic cell is the same as the target cell is used to determine whether the first sum value and the second sum value are equal.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: at least one of whether the scheduling cell set comprises the target cell or whether the characteristic cell is the same as the target cell is used to determine whether the first characteristic sum value and the second characteristic sum value are equal.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: when the characteristic cell and the target cell are different, the first characteristic sum value and the second characteristic sum value are not equal.

In one embodiment, the above phrase of "at least one of whether the scheduled cell set comprises the target cell or whether the characteristic cell is the same as the target cell being used to determine the target proportional value between the first proportional value and the second proportional value" comprises the following meaning: when the scheduling cell set comprises the target cell, the first sum value and the second sum value are not equal.

Embodiment 10

Figure 10:
FIG. 10 illustrates a schematic diagram of a relation a first cell subset and a second cell subset according to one embodiment of the present application.
Figure 10:
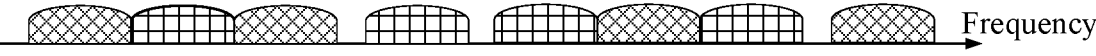

Embodiment 10 illustrates a schematic diagram of a relation between a first cell subset and a second cell subset according to one embodiment of the present application, as shown in FIG. 10. In FIG. 10, the horizontal axis represents frequency, each filled block with an arc top represents a serving cell, each cross line-filled block with an arc top represents a serving cell in a first cell subset, and each reticle-filled block with an arc top represents a serving cell in a second cell subset.

In embodiment 10, the first cell subset in the present application comprises at least one serving cell, and the second cell subset in the present application comprises at least one serving cell; a number of serving cell(s) belonging to the first cell subset comprised in the scheduled cell set in the present application is equal to a first number, and a number of serving cell(s) belonging to the second cell subset comprised in the scheduled cell set in the present application is equal to a second number; the first characteristic sum value in the present application is linearly correlated with a product of a number of serving cell(s) comprised in the second cell subset and a first factor, and the first characteristic sum value is linearly correlated with a number of serving cell(s) comprised in the first cell subset; the first sum value is linearly correlated with a product of the second number and the first factor, and the first sum value is linearly correlated with the first number; the first factor is configurable, or the first factor is pre-defined.

In one embodiment, any serving cell comprised in the first cell subset only supports single-TRP and single-panel.

In one embodiment, a serving cell comprised in the first cell subset is not allocated a CORESET pool index.

In one embodiment, a serving cell comprised in the first cell subset is only allocated a CORESET pool index.

In one embodiment, corresponding to all CORESETs on all BWPs on each serving cell comprised in the first cell subset, the first node in the present application is only provided a CORESET Pool Index.

In one embodiment, on each BWP on each serving cell comprised in the first cell subset, the first node in the present application is only provided with a CORESET.

In one embodiment, any serving cell comprised in the second cell subset supports multiple TRPs.

In one embodiment, any serving cell comprised in the second cell subset supports multiple panels.

In one embodiment, on any BWP on each serving cell comprised in the second cell subset, the first node in the present application is provided with multiple CORESETs.

In one embodiment, on any BWP on each serving cell comprised in the second cell subset, the first node in the present application is provided with multiple CORESET Pool Indexes.

In one embodiment, on any BWP on each serving cell comprised in the second cell subset, the first node in the present application is provided with two CORESETs.

In one embodiment, on any BWP on each serving cell comprised in the second cell subset, the first node in the present application is provided with two CORESET Pool Indexes.

In one embodiment, on any BWP on each serving cell comprised in the second cell subset, a value of a CORESET Pool Index provided by the first node in the present application for a CORESET is equal to 0, and a value of a CORESET Pool Index provided by the first node in the present application for another CORESET is equal to 1.

In one embodiment, on any BWP on each serving cell comprised in the second cell subset, a value of a CORESET Pool Index provided by the first node in the present application for a first CORESET is equal to 0, a value of a CORESET Pool Index provided by the first node in the present application for a second CORESET is equal to 1, and the first CORESET is not the same as the second CORESET.

In one embodiment, the first number is a non-negative integer.

In one embodiment, the second number is a non-negative integer.

In one embodiment, the first number may be equal to 0.

In one embodiment, the second number may be equal to 0.

In one embodiment, the first number is greater than 0.

In one embodiment, the second number is greater than 0.

In one embodiment, any serving cell comprised in the scheduled cell set belongs to one of the first cell subset or the second cell subset.

In one embodiment, any serving cell comprised in the scheduled cell set belongs to the first cell subset or belongs to the second cell subset.

In one embodiment, the scheduled cell set comprises a serving cell belonging neither to the first cell subset nor to the second cell subset.

In one embodiment, the first factor is equal to 1.

In one embodiment, the first factor is not equal to 1.

In one embodiment, the above phrase of "the first factor being configured" comprises: the first factor is configured by the second node in the present application.

In one embodiment, the above phrase of "the first factor being configured" comprises: the first factor is reported by the first node in the present application.

In one embodiment, the above phrase of "the first factor being configured" comprises: the first processor also receives eighth information, herein, the eighth information is used to indicate the first factor.

In one embodiment, the above phrase of "the first factor being configured" comprises: the first processor also transmits ninth information, herein, the ninth information is used to indicate the first factor.

In one embodiment, the above phrase of "the first factor being pre-defined" comprises the following meaning: the first factor is equal to a fixed value.

In one embodiment, the above phrase of "the first factor being pre-defined" comprises the following meaning: the first factor is equal to 1.

In one embodiment, the above phrase of "the first factor being pre-defined" comprises the following meaning: the first factor is equal to a default value.

In one embodiment, the first factor is a Blind Decoding (BD) factor.

In one embodiment, the first factor is used to determine a multiple by which a number of blind detection(s) can be increased.

In one embodiment, any serving cell comprised in the first cell subset belongs to the configuration cell group, and any serving cell comprised in the second cell subset belongs to the configuration cell group.

In one embodiment, the configuration cell group comprises any serving cell comprised in the first cell subset, and the configuration cell group comprises any serving cell comprised in the second cell subset.

In one embodiment, the above phrase of "the first characteristic sum value being linearly correlated with a product of a number of serving cell(s) comprised in the second cell subset and a first factor, and the first characteristic sum value being linearly correlated with a number of serving cell(s) comprised in the first cell subset" is implemented through the following formula:

$$\text{Sum}_1 = N_{cells,0}^{DL} + \gamma \cdot N_{cells,1}^{DL}$$

herein, $\text{Sum}_1$ represents the first characteristic sum value, $$N_{cells,0}^{DL}$$

represents a number of serving cell(s) comprised in the first cell subset, $$N_{cells,1}^{DL}$$

represents a number of serving cell(s) comprised in the second cell subset, $\gamma$ represents the first factor.

In one embodiment, the above phrase of "the first characteristic sum value being linearly correlated with a product of a number of serving cell(s) comprised in the second cell subset and a first factor, and the first characteristic sum value being linearly correlated with a number of serving cell(s) comprised in the first cell subset" is implemented through the following formula:

$$\text{Sum}_1 = \sum_{j=0} \left( N_{cells,0}^{DL,j} + \gamma \cdot N_{cells,1}^{DL,j} \right)$$

herein, $\text{Sum}_1$ represents the first characteristic sum value, $$N_{cells,0}^{DL,j}$$

represents a number of serving cell(s) indexed as j configured with numerology comprised in the first cell subset, $$\sum_{j=0} N_{cells,0}^{DL,j}$$

represents a number of serving cell(s) comprised in the first cell subset, $$N_{cells,1}^{DL,j}$$

represents a number of serving cell(s) indexed as j configured with numerology comprised in the second cell subset, $$\sum_{j=0} N_{cells,1}^{DL,j}$$

represents a number of serving cell(s) comprised in the second cell subset, and $\gamma$ represents the first factor.

In one embodiment, the above phrase of "the first characteristic sum value being linearly correlated with a product of a number of serving cell(s) comprised in the second cell subset and a first factor, and the first characteristic sum value being linearly correlated with a number of serving cell(s) comprised in the first cell subset" comprises the following meaning: the first characteristic sum value is equal to a sum number of a product of a number of serving cell(s) comprised in the second cell subset and a first factor plus a number of serving cell(s) comprised in the first cell subset.

In one embodiment, the above phrase of "the first characteristic sum value being linearly correlated with a product of a number of serving cell(s) comprised in the second cell subset and a first factor, and the first characteristic sum value being linearly correlated with a number of serving cell(s) comprised in the first cell subset" comprises the following meaning: the first characteristic sum value is in a positive linear correlation with a product of a number of serving cell(s) comprised in the second cell subset and a first factor, and the first characteristic sum value is in a positive linear correlation with a number of serving cell(s) comprised in the first cell subset.

In one embodiment, the above phrase of "the first sum value being linearly correlated with a product of the second number and the first factor, and the first sum value being linearly correlated with the first number" comprises the following meaning: the first sum value is equal to a sum number of a product of the second number and the first factor plus the first number.

In one embodiment, the above phrase of "the first sum value being linearly correlated with a product of the second number and the first factor, and the first sum value being linearly correlated with the first number" comprises the following meaning: the first sum value is in a positive linear correlation with a product of the second number and the first factor, and the first sum value is in a positive linear correlation with the first number.

In one embodiment, the above phrase of "the first sum value being linearly correlated with a product of the second number and the first factor, and the first sum value being linearly correlated with the first number" is implemented through the following meaning:

$$\Omega_1 = N_{cells,0}^{DL,\mu} + \gamma \cdot N_{cells,1}^{DL,\mu}$$

herein, $\Omega_1$ represents the first sum value, $$N_{cells,0}^{DL,\mu}$$

represents the first number, $$N_{cells,1}^{DL,\mu}$$

represents the second number, and $\gamma$ represents the first factor.

Embodiment 11

Figure 11:
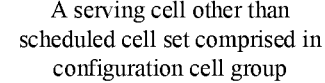
FIG. 11 illustrates a schematic diagram of a first characteristic sum value and a first sum value according to one embodiment of the present application.
Figure 11:
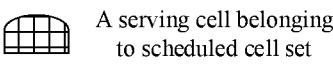
Figure 11:
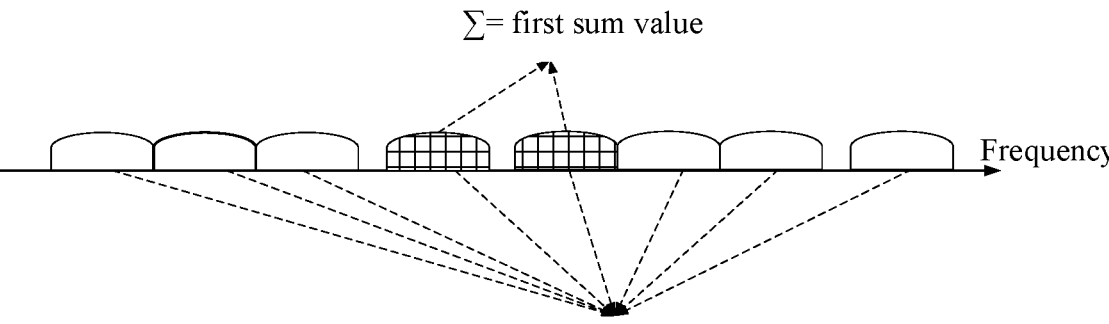

Embodiment 11 illustrates a schematic diagram of a first characteristic sum value and a first sum value according to one embodiment of the present application, as shown in FIG. 11. In FIG. 11, the horizontal axis represents frequency, each unfilled block with an arc top represents a serving cell other than a scheduled cell set in a configuration cell group, and each reticle-filled block with an arc top represents a serving cell in a scheduled cell set.

In embodiment 11, the first characteristic sum value in the present application is equal to a number of serving cell(s) comprised in the configuration cell group in the present application; the first sum value in the present application is equal to a number of serving cell(s) comprised in the scheduled cell set in the present application.

In one embodiment, a number of serving cell(s) comprised in the configuration cell group is equal to a number of serving cell(s) comprised in the scheduled cell set.

In one embodiment, a number of serving cell(s) comprised in the configuration cell group is not equal to a number of serving cell(s) comprised in the scheduled cell set.

In one embodiment, a number of serving cell(s) comprised in the configuration cell group is greater than a number of serving cell(s) comprised in the scheduled cell set.

Embodiment 12

Figure 12:
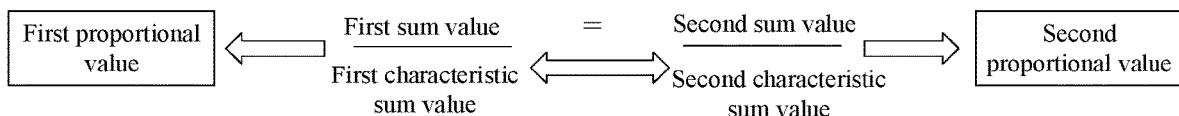
FIG. 12 illustrates a schematic diagram of a first characteristic sum value and a second characteristic sum value according to one embodiment of the present application.

Embodiment 12 illustrates a schematic diagram of a relation between a first characteristic sum value and a second characteristic sun value according to one embodiment of the present application, as shown in FIG. 12. In FIG. 12, each rectangle represents one of a first proportional value or a second proportional value, and the arrow represents the calculation procedure.

In embodiment 12, the second sum value in the present application is equal to the first sum value in the present application, and the first characteristic sum value in the present application is not equal to the second sum value in the present application; a difference value between the second characteristic sum value and the first characteristic sum value is predefined, or a difference value between the second characteristic sum value and the first characteristic sum value is configurable.

In one embodiment, the above phrase of "a difference value between the second characteristic sum value and the first characteristic sum value being predefined, or a difference value between the second characteristic sum value and the first characteristic sum value being configurable" comprises the following meaning: a difference value between the second characteristic sum value and the first characteristic sum value is pre-defined.

In one embodiment, the above phrase of "a difference value between the second characteristic sum value and the first characteristic sum value being predefined, or a difference value between the second characteristic sum value and the first characteristic sum value being configurable" comprises the following meaning: a difference value between the second characteristic sum value and the first characteristic sum value is configurable.

In one embodiment, the above phrase of "a difference value between the second characteristic sum value and the first characteristic sum value being predefined, or a difference value between the second characteristic sum value and the first characteristic sum value being configurable" comprises the following meaning: in some cases, a difference value between the second characteristic sum value and the first characteristic sum value is predefined, and in other cases, a difference value between the second characteristic sum value and the first characteristic sum value is configurable.

In one embodiment, the above phrase of "a difference value between the second characteristic sum value and the first characteristic sum value being pre-defined" comprises the following meaning: a difference value between the second characteristic sum value and the first characteristic sum value is fixed.

In one embodiment, the above phrase of "a difference value between the second characteristic sum value and the first characteristic sum value being pre-defined" comprises the following meaning: a difference value between the second characteristic sum value and the first characteristic sum value is hard coded in standard protocols.

In one embodiment, the above phrase of "a difference value between the second characteristic sum value and the first characteristic sum value being pre-defined" comprises the following meaning: a difference value between the second characteristic sum value and the first characteristic sum value is equal to 1.

In one embodiment, the above phrase of "a difference value between the second characteristic sum value and the first characteristic sum value being pre-defined" comprises the following meaning: the second characteristic sum value is 1 greater than the first characteristic sum value.

In one embodiment, the above phrase of "a difference value between the second characteristic sum value and the first characteristic sum value being pre-defined" comprises the following meaning: a difference value between the second characteristic sum value and the first characteristic sum value is equal to a default value.

In one embodiment, the above phrase of "a difference value between the second characteristic sum value and the first characteristic sum value being configurable" comprises the following meaning: a difference value between the second characteristic sum value and the first characteristic sum value is configured by the second node in the present application.

In one embodiment, the above phrase of "a difference value between the second characteristic sum value and the first characteristic sum value being configurable" comprises the following meaning: a difference value between the second characteristic sum value and the first characteristic sum value is reported by the first node in the present application.

In one embodiment, the above phrase of "a difference value between the second characteristic sum value and the first characteristic sum value being configurable" comprises the following meaning: the first processor in the present application receives tenth information, herein, the tenth information is used to indicate a difference value between the second characteristic sum value and the first characteristic sum value.

In one embodiment, the above phrase of "a difference value between the second characteristic sum value and the first characteristic sum value being configurable" comprises the following meaning: the first processor in the present application transmits tenth information, herein, the tenth information is used to indicate a difference value between the second characteristic sum value and the first characteristic sum value.

Embodiment 13

Figure 13:
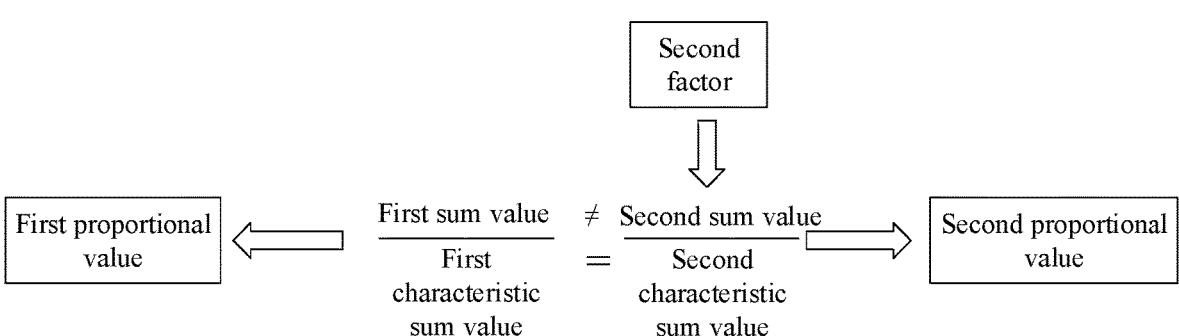
FIG. 13 illustrates a schematic diagram of a second factor and a second sum value according to one embodiment of the present application.

Embodiment 13 illustrates a schematic diagram of a relation between a second factor and a second sum value according to one embodiment of the present application, as shown in FIG. 13. In FIG. 13, three rectangles respectively represent a first proportional value, a second proportional value and a second factor, and the arrows represent the calculation procedure.

In embodiment 13, the fourth information in the present application is used to determine a second factor, the second factor is a positive number less than 1, the second factor is used to determine the second sum value in the present application, the second sum value is not equal to the first sum value in the present application, and the second characteristic sum value in the present application is equal to the first characteristic sum value in the present application.

In one embodiment, the above phrase of "the second factor being used to determine the second sum value" comprises the following meaning: the second factor is used by the first node in the present application to determine the second sum value.

In one embodiment, the above phrase of "the second factor being used to determine the second sum value" comprises the following meaning: the second factor is used to calculate the second sum value.

In one embodiment, the above phrase of "the second factor being used to determine the second sum value" comprises the following meaning: the second sum value is obtained after the second factor is through operational function.

In one embodiment, the above phrase of "the second factor being used to determine the second sum value" comprises the following meaning: when the first cell subset in the present application comprises the characteristic cell, the second sum value is equal to a difference value between the first sum value and the second factor; when the second cell subset in the present application comprises the characteristic cell, the second sum value is equal to a difference value between the first sum value minus a product of the first factor in the present application and the second factor.

In one embodiment, the above phrase of "the second factor being used to determine the second sum value" is implemented through the following formula:

when the first cell subset in the present application comprises the characteristic cell, $$\Omega_2 = \Omega_1 - \vartheta$$

when the second cell subset in the present application comprises the characteristic cell, $$\Omega_2 = \Omega_1 - \gamma \cdot \vartheta$$

herein, $\Omega_2$ represents the second sum value, $\Omega_1$ represents the first sum value, $\gamma$ represents the first factor, represents the second factor.

In one embodiment, the above phrase of "the second factor being used to determine the second sum value" comprises the following meaning: the second sum value is equal to a difference value between the first sum value and the second factor.

Embodiment 14

Figure 14:
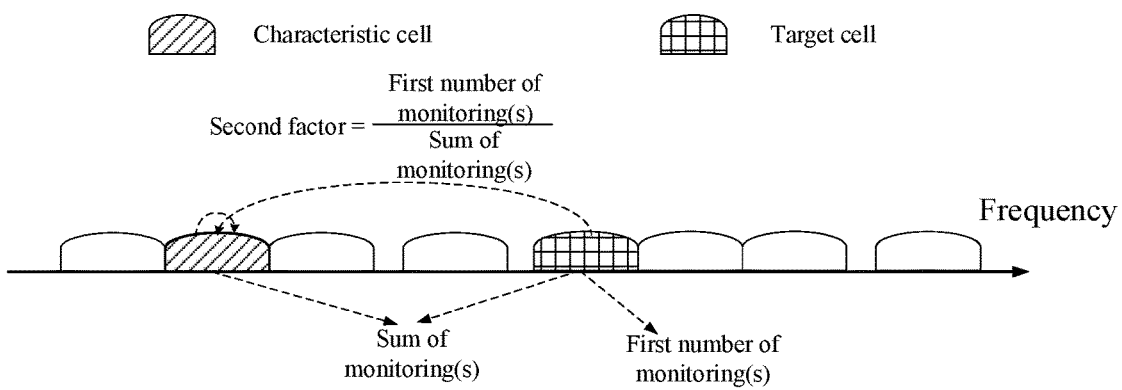
FIG. 14 illustrates a schematic diagram of a second factor according to one embodiment of the present application.

Embodiment 14 illustrates a schematic diagram of a second factor according to one embodiment of the present application, as shown in FIG. 14. In FIG. 14, the horizontal axis represents frequency, each filled block with an arc top represents a serving cell, the slash-filled block with an arc top represents a characteristic cell, the reticle filled block with an arc top represents a target cell, and the dashed arc with an arrow represents a scheduling and scheduled relationship between two serving cells.

In Embodiment 14, the fourth information in the present application is used to determine a first number of monitoring (s) and a sum number of monitoring(s), the first number of monitoring(s) is equal to a number of monitoring(s) performed on at least one control signaling candidate used to schedule the characteristic cell in the present application in the target cell in the present application, and the sum number of monitoring(s) is equal to a total number of monitoring(s) performed on at least one control signaling candidate used to schedule the characteristic cell; the second factor in the present application is linearly correlated with a ratio of the first number of monitoring(s) and the sum number of monitoring(s).

In one embodiment, the first number of monitoring(s) is a non-negative integer.

In one embodiment, the first number of monitoring(s) is a positive integer.

In one embodiment, the sum number of monitoring(s) is a positive integer.

In one embodiment, the sum number of monitoring(s) is a positive integer not less than the first number of monitoring (s).

In one embodiment, the above phrase of "the fourth information being used to determine a first number of monitoring(s) and a sum number of monitoring(s)" comprises the following meaning: the fourth information is used by the first node in the present application to determine the first number of monitoring(s) and the sum number of monitoring(s).

In one embodiment, the above phrase of "the fourth information being used to determine a first number of monitoring(s) and a sum number of monitoring(s)" comprises the following meaning: the fourth information is used to explicitly indicate the first number of monitoring(s) and the sum number of monitoring(s).

In one embodiment, the above phrase of "the fourth information being used to determine a first number of monitoring(s) and a sum number of monitoring(s)" comprises the following meaning: the fourth information is used to implicitly indicate the first number of monitoring(s) and the sum number of monitoring(s).

In one embodiment, the above phrase of "the fourth information being used to determine a first number of monitoring(s) and a sum number of monitoring(s)" comprises the following meaning: the fourth information is used to indirectly indicate the first number of monitoring(s) and the sum number of monitoring(s).

In one embodiment, the above phrase of "the fourth information being used to determine a first number of monitoring(s) and a sum number of monitoring(s)" comprises the following meaning: the fourth information comprises Y sub-information blocks, Y being a positive integer greater than 1, the Y sub-information blocks are respectively used to indicate Y monitoring numbers, the first number of monitoring(s) is a sum of Y1 monitoring number(s) among the Y monitoring numbers, the sum of monitoring(s) is a sum of Y2 monitoring number(s) among the Y monitoring numbers, Y1 being a positive integer not greater than the Y, Y2 being a positive integer not greater than the Y, and any of the Y monitoring numbers is a positive integer.

In one embodiment, the fourth information comprises an IE "PDCCH-Config" used to schedule the characteristic cell.

In one embodiment, the fourth information comprises a field "searchSpace" in an IE "PDCCH-Config" used to schedule the characteristic cell.

In one embodiment, the fourth information is used to determine a number of monitoring(s) performed on control signaling candidate(s) of each Aggregation Level (AL) used to schedule the characteristic cell in the target cell, and the first number of monitoring(s) is equal to a sum number of monitoring(s) performed on control signaling candidate(s) of each AL used to schedule the characteristic cell in the target cell.

In one embodiment, the above phrase of "the fourth information being used to determine a first number of monitoring(s) and a sum number of monitoring(s)" comprises the following meaning: the fourth information comprises Y sub-information blocks, Y being a positive integer greater than 1, the Y sub-information blocks are respectively used to indicate Y monitoring numbers, the first number of monitoring(s) is a sum of Y1 monitoring number(s) among the Y monitoring numbers, and the Y1 monitoring number (s) is(are respectively) equal to monitoring number(s) performed on at least one control signaling candidate in Y1 search space(s) used to schedule the characteristic cell in the target cell; the sum number of monitoring(s) is a sum of Y2 monitoring number(s) among the Y monitoring numbers, and the Y2 monitoring number(s) is(are respectively) equal to monitoring number(s) performed on at least one control signaling candidate in Y2 search space(s) used to schedule the characteristic cell; Y1 being a positive integer not greater than Y, Y2 being a positive integer not greater than the Y; any of the Y monitoring numbers is a positive integer.

In one embodiment, the above phrase of "the first number of monitoring(s) being equal to a number of monitoring(s) performed on at least one control signaling candidate used to schedule the characteristic cell in the target cell" comprises the following meaning: the first number of monitoring(s) is equal to a sum number of monitoring(s) performed on control signaling candidate(s) of each AL used to schedule the characteristic cell in the target cell.

In one embodiment, the above phrase of "the first number of monitoring(s) being equal to a number of monitoring(s) performed on at least one control signaling candidate used to schedule the characteristic cell in the target cell" comprises the following meaning: the first number of monitoring(s) is equal to a number of monitoring(s) performed on at least control signaling candidate used to schedule the characteristic cell in the first time window in the target cell.

In one embodiment, the above phrase of "the first number of monitoring(s) being equal to a number of monitoring(s) performed on at least one control signaling candidate used to schedule the characteristic cell in the target cell" comprises the following meaning: the first number of monitoring(s) is equal to a total number of monitoring(s) performed on all control signaling candidate(s) used to schedule the characteristic cell in the first time window in the target cell.

In one embodiment, the above phrase of "the first number of monitoring(s) being equal to a number of monitoring(s) performed on at least one control signaling candidate used to schedule the characteristic cell in the target cell" comprises the following meaning: the first number of monitoring(s) is equal to a sum number of monitoring(s) performed on control signaling candidate(s) of each AL used to schedule the characteristic cell in the first time window in the target cell.

In one embodiment, the above phrase of "the sum number of the monitoring(s) being equal to a total number of monitoring(s) performed on at least one control signaling candidate used to schedule the characteristic cell" comprises the following meaning: the sum number of monitoring(s) is equal to a sum number of monitoring(s) performed on control signaling candidate(s) of each AL used to schedule the characteristic cell.

In one embodiment, the above phrase of "the sum number of monitoring(s) being equal to a total number monitoring(s) performed on at least one control signaling candidate used to schedule the characteristic cell" comprises the following meaning: the sum number of monitoring(s) is equal to a sum number of the first number of monitoring(s) and a second number of monitoring(s), and the second number of monitoring(s) is equal to a number of monitoring(s) performed on at least one control signaling candidate used to schedule the characteristic cell in the characteristic cell.

In one embodiment, the above phrase of "the sum number of monitoring(s) being equal to a total number monitoring(s) performed on at least one control signaling candidate used to schedule the characteristic cell" comprises the following meaning: the sum number of monitoring(s) is equal to a sum number of the first number of monitoring(s) and a second number of monitoring(s), and the second number of monitoring(s) is equal to a number of monitoring(s) performed on at least one control signaling candidate used to schedule the characteristic cell in the first time window in the characteristic cell.

In one embodiment, the above phrase of "the sum number of monitoring(s) being equal to a total number monitoring(s) performed on at least one control signaling candidate used to schedule the characteristic cell" comprises the following meaning: the sum number of monitoring(s) is equal to a sum number of the first number of monitoring(s) and a second number of monitoring(s), and the second number of monitoring(s) is equal to a sum number of monitoring(s) performed on control signaling candidate(s) of each AL used to schedule the characteristic cell in the first time window in the characteristic cell.

In one embodiment, the above phrase of "the second factor being linearly correlated with a ratio of the first number of monitoring(s) and the sum number of the monitoring(s)" comprises the following meaning: the second factor is negatively linearly correlated with a ratio of the first number of monitoring(s) and the sum number of monitoring (s).

In one embodiment, the above phrase of "the second factor being linearly correlated with a ratio of the first number of monitoring(s) and the sum number of the monitoring(s)" comprises the following meaning: the second factor is equal to 1 minus a difference value of a ratio of the first number of monitoring(s) and the sum number of the monitoring(s).

In one embodiment, "the second factor being linearly correlated with a ratio of the first number of monitoring(s) and the sum number of the monitoring(s)" is implemented through the following formula:

$$\vartheta = 1 - \frac{M_1}{M_{total}}$$

herein, $\vartheta$ represents the second factor, $M_1$ represents the first number of monitoring(s), and $M_{total}$ represents the sum number of the monitoring(s).

Embodiment 15

Embodiment 15 illustrates a schematic diagram of a relation between a first parameter and a first SCS according to one embodiment of the present application, as shown in FIG. 15. In FIG. 15, the first column on the left represents an index scheduling an SCS, the second column on the left represents X candidate parameters, an SCS index in bold is an index of a first SCS, and a candidate parameter in bold is a first parameter.

In Embodiment 15, the first SCS in the present application is one of the X candidate SCSs, X being a positive integer greater than 1; the X candidate SCSs respectively correspond to X candidate parameters, and each of the X candidate parameters is a positive integer; a first parameter is a candidate parameter corresponding to the first SCS in the X candidate parameters, the first threshold value in the present application is equal to a target value rounded down to an integer, and the first parameter is used to determine the target value.

In one embodiment, any of the X candidate SCSs is equal to one of 15 kHz, 30 kHz, 60 kHz or 120 kHz.

In one embodiment, any of the X candidate SCSs is equal to one of 15 kHz, 30 kHz, 60 kHz, 120 kHz or 240 kHz.

In one embodiment, any of the X candidate SCSs is equal to 15 kHz multiplied by a non-negative integral power of 2.

In one embodiment, X is equal to 4.

In one embodiment, X is greater than 4.

In one embodiment, X is not less than 4.

In one embodiment, the X candidate SCSs are predefined.

In one embodiment, the X candidate SCSs are fixed.

In one embodiment, the X candidate SCSs consist of all SCSs supported by R17 version.

In one embodiment, the X candidate SCSs consist of all SCSs supported by R16 version.

In one embodiment, any two of the X candidate SCSs are not equal.

In one embodiment, any of the X candidate parameters is a number of monitoring(s) performed on a largest PDCCH candidate in a slot on a serving cell.

In one embodiment, any two of the X candidate parameters are not equal.

In one embodiment, there exist two of the X candidate parameters being equal.

In one embodiment, X is equal to 4, and the X candidate parameters are respectively 44, 36, 22, 20.

In one embodiment, any of the X candidate parameters is a possible value of $$M_{PDCCH}^{max,slot,\mu}.$$

In one embodiment, the target value is an integer.

In one embodiment, the target value is a fraction.

In one embodiment, the target value is a rational number.

In one embodiment, the target value is a non-integral rational number.

In one embodiment, the above phrase of "the first parameter being used to determine the target value" comprises the following meaning: the target value is proportional to the first parameter.

In one embodiment, the above phrase of "the first parameter being used to determine the target value" comprises the following meaning: the first parameter is used by the first node in the present application to determine the target value.

In one embodiment, the above phrase of "the first parameter being used to determine the target value" comprises the following meaning: the target value is proportional to the first parameter, and a proportional coefficient between the target value and the first parameter is related to the target proportional value in the present application.

In one embodiment, the above phrase of "the first parameter being used to determine the target value" comprises the following meaning: the target value is proportional to the first parameter, and a proportional coefficient between the target value and the first parameter is related to the first capability parameter in the present application.

In one embodiment, the above phrase of "the first parameter being used to determine the target value" comprises the following meaning: the target value is proportional to the first parameter, and a proportional coefficient between the target value and the first parameter is equal to a product between the target proportional value in the present application and the first capability parameter in the present application.

In one embodiment, the above phrase of "the first parameter being used to determine the target value" comprises the following meaning: for the given target proportional value in the present application and the first capability parameter in the present application, the target value is linearly correlated with the first parameter.

In one embodiment, the above phrase of "the first parameter being used to determine the target value" comprises the following meaning: the target value is equal to a product of the first parameter, the target proportional value in the present application and the first capability parameter.

In one embodiment, the above phrase of "the first parameter being used to determine the target value" comprises the following meaning: the first parameter is used to determine the target value through functional operation.

In one embodiment, the above phrase of "the first parameter being used to determine the target value" is implemented through the following formula:

$$M_{PDCCH}^{total,slot,\mu} = \lfloor N_{cells}^{cap} \cdot M_{PDCCH}^{max,slot,\mu} \cdot P_{cells}^{DL,\mu} \rfloor$$

herein, $$M_{PDCCH}^{total,slot,\mu}$$

represents the first threshold value, $$N_{cells}^{cap} \cdot M_{PDCCH}^{max,slot,\mu} \cdot P_{cells}^{DL,\mu}$$

represents the target value, $$M_{PDCCH}^{max,slot,\mu}$$

represents the first parameter, $$P_{cells}^{DL,\mu}$$

represents the target proportional value in the present application, $$N_{cells}^{cap}$$

represents the first capability parameter in the present application, and $\mu$ represents an index of the first SCS.

In one embodiment, the first node in the present application is not required that a number of monitoring(s) performed on a control signaling candidate comprised in the target control signaling candidate set on any sub-band in the first sub-band set in the first time window exceeds a smaller value compared between the first threshold value and the first parameter.

In one embodiment, for each serving cell comprised in the scheduled cell set in the present application, the first node in the present application is not required that a number of monitoring(s) performed on a control signaling candidate comprised in the target control signaling candidate set on any sub-band in the first sub-band set in the first time window exceeds a smaller value compared between the first threshold value and the first parameter.

In one embodiment, for each serving cell belonging to the scheduled cell set in the present application and the first cell subset in the present application, the first node in the present application is not required that a number of monitoring(s) performed on a control signaling candidate comprised in the target control signaling candidate set on any sub-band in the first sub-band set in the first time window exceeds a smaller value compared between the first threshold value and the first parameter.

In one embodiment, the first node in the present application is not required that a number of monitoring(s) performed on a control signaling candidate comprised in the target control signaling candidate set on any sub-band in the first sub-band set in the first time window exceeds a smaller value compared between the first threshold value and the first product, and the first product is equal to a product between the first factor and the first parameter.

In one embodiment, for each serving cell belonging to the scheduled cell set and the second cell subset in the present application simultaneously, the first node in the present application is not required that a number of monitoring(s) performed on a control signaling candidate comprised in the target control signaling candidate set on any sub-band in the first sub-band set in the first time window exceeds a smaller value compared between the first threshold value and the first product, and the first product is equal to a product between the first factor and the first parameter.

In one embodiment, for each serving cell belonging to the scheduled cell set in the present application and the second cell subset in the present application simultaneously, the first node in the present application is not required that a number of monitoring(s) performed on a control signaling candidate comprised in the target control signaling candidate set on any sub-band in the first sub-band set in the first time window exceeds a smaller value compared between the first threshold value and the first parameter.

In one embodiment, for each serving cell whose corresponding scheduling cell belonging to the first cell subset in the present application comprised in the scheduled cell set in the present application, the first node in the present application is not required that a number of monitoring(s) performed on a control signaling candidate comprised in the target control signaling candidate set on any sub-band in the first sub-band set in the first time window exceeds a smaller value compared between the first threshold value and the first parameter.

In one embodiment, for each serving cell whose corresponding scheduling cell belonging to the second cell subset in the present application comprised in the scheduled cell set in the present application, the first node in the present application is not required that a number of monitoring(s) performed on a control signaling candidate comprised in the target control signaling candidate set on any sub-band in the first sub-band set in the first time window exceeds a smaller value compared between the first threshold value and the first product, and the first product is equal to a product between the first factor and the first parameter.

In one embodiment, for each serving cell whose corresponding scheduling cell belonging to the second cell subset in the present application comprised in the scheduled cell set in the present application, the first node in the present application is not required that a number of monitoring(s) performed on a control signaling candidate comprised in the target control signaling candidate set on any sub-band in the first sub-band set in the first time window exceeds a smaller value compared between the first threshold value and the first parameter.

Embodiment 16

Figure 16:
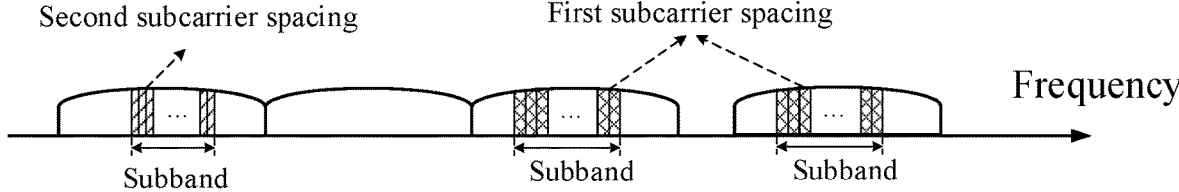
FIG. 16 illustrates a schematic diagram of a relation between a first SCS and a second SCS according to one embodiment of the present application.

Embodiment 16 illustrates a schematic diagram of a relation between a second factor and a second sum value according to one embodiment of the present application, as shown in FIG. 16. In FIG. 16, the horizontal axis represents frequency, each block area with an arc top represents a serving cell, each slash-filled column bar represents a subcarrier in a sub-band, and each cross-line filled column bar represents a subcarrier comprised in a sub-band comprised in a first sub-band set.

In embodiment 16, the characteristic cell in the present application comprises a characteristic sub-band, the characteristic sub-band comprises at least one subcarrier, an SCS of any subcarrier comprised in the characteristic sub-band is equal to a second SCS, and the first SCS and the second SCS are not equal.

In one embodiment, the above phrase of "the characteristic cell comprising a characteristic sub-band" comprises the following meaning: a carrier corresponding to the characteristic cell comprises a characteristic sub-band.

In one embodiment, the above phrase of "the characteristic cell comprising a characteristic sub-band" comprises the following meaning: the characteristic sub-band belongs to the characteristic cell.

In one embodiment, the above phrase of "the characteristic cell comprising a characteristic sub-band" comprises the following meaning: the characteristic sub-band belongs to a carrier corresponding to the characteristic cell.

In one embodiment, the above phrase of "the characteristic cell comprising a characteristic sub-band" comprises the following meaning: the characteristic sub-band is used for the characteristic cell.

In one embodiment, the characteristic sub-band is an active BWP of the characteristic cell.

In one embodiment, the characteristic sub-band is an inactive BWP of the characteristic cell.

In one embodiment, the characteristic sub-band is an Initial BWP of the characteristic cell.

In one embodiment, the characteristic sub-band is a Default BWP of the characteristic cell.

In one embodiment, the characteristic sub-band comprises multiple subcarriers.

In one embodiment, the characteristic sub-band comprises a positive integral multiple of 12 sub-carriers.

In one embodiment, the characteristic sub-band comprises multiple subcarriers, and SCSs of any two subcarriers comprised in the characteristic sub-band are equal.

In one embodiment, the second SCS is equal to 15 kHz multiplied by a non-negative integral power.

In one embodiment, the second SCS is equal to one of 15 kHz, 30 kHz, 60 kHz or 120 kHz.

In one embodiment, the second SCS is greater than the first SCS.

In one embodiment, the second SCS is less than the first SCS.

Embodiment 17

Figure 17:
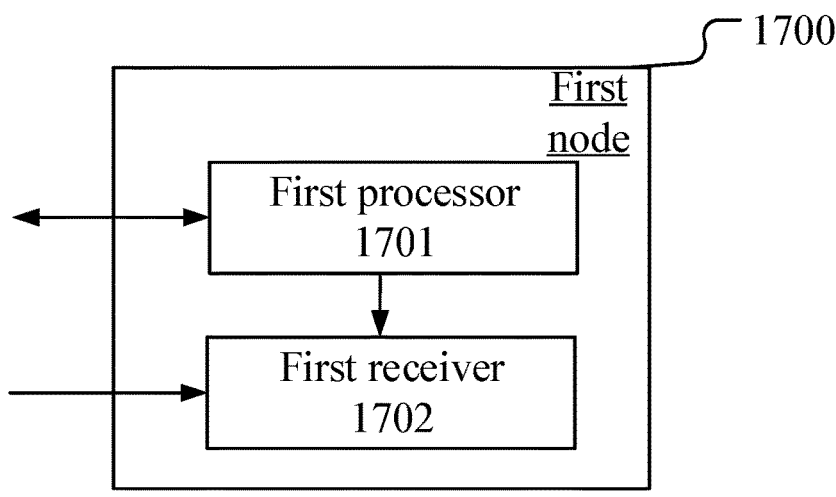
FIG. 17 illustrates a structure block diagram of a processing device in a first node according to one embodiment of the present application.

Embodiment 17 illustrates the structure block diagram of a processing device in a first node, as shown in FIG. 17. In FIG. 17, a processing device 1700 of a first node comprises a first processor 1701 and a first receiver 1702. The first processor 1701 comprises the transmitter/receiver 456 (including the antenna 460), the transmitting processor 455, the receiving processor 452 and the controller/processor 490 in FIG. 4 of the present application; the first receiver 1702 comprises the transmitter/receiver 456 (including the antenna 460), the receiving processor 452 and the controller/processor 490 in FIG. 4 of the present application.

In embodiment 17, the first processor 1701 receives first information, the first information is used to determine a target cell, the target cell is used to schedule a characteristic cell, and the characteristic cell and the target cell belong to a same cell group; and the first receiver 1702 monitors at least one control signaling candidate comprised in a target control signaling candidate set, the target control signaling candidate set comprises at least one control signaling candidate; herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

In one embodiment, the first processor 1701 receives second information; herein, the second information is used to determine a configuration cell group, and the configuration cell group comprises multiple serving cells; the target cell belongs to the configuration cell group, the characteristic cell belongs to the configuration cell group, and the characteristic cell is a PCell in the configuration cell group; a scheduled cell set comprises a serving cell scheduled by a serving cell comprised in the scheduling cell set, and the scheduled cell set comprises at least one serving cell; any serving cell comprised in the scheduling cell set belongs to the configuration cell group, and any serving cell comprised in the scheduled cell set belongs to the configuration cell group.

In one embodiment, a target proportional value is used to determine the first threshold value, the target proportional value is a positive number not greater than 1, and the target proportional value is equal to one of a first proportional value or a second proportional value; the first proportional value is equal to a ratio of a first sum value and a first characteristic sum value, and the second proportional value is equal to a ratio of the second sum value and a second characteristic sum value; the first sum value is a positive number, the first characteristic sum value is a positive number not less than the first sum value, the second sum value is a positive number, the second characteristic sum value is a positive number not less than the second sum value, and the first proportional value and the second proportional value are not equal; at least one of whether the scheduling cell set comprises the target cell or whether the characteristic cell is the same as the target cell is used to determine the target proportional value between the first proportional value and the second proportional value.

In one embodiment, the first processor 1701 receives third information; herein, the third information is used to determine a first cell subset and a second cell subset, the first cell subset comprises at least one serving cell, and the second cell subset comprises at least one serving cell; a number of serving cell(s) belonging to the first cell subset comprised in the scheduled cell set in the present application is equal to a first number, and a number of serving cell(s) belonging to the second cell subset comprised in the scheduled cell set in the present application is equal to a second number; the first characteristic sum value in the present application is linearly correlated with a product of a number of serving cell(s) comprised in the second cell subset and a first factor, and the first characteristic sum value is linearly correlated with a number of serving cell(s) comprised in the first cell subset; the first sum value is linearly correlated with a product of the second number and the first factor, and the first sum value is linearly correlated with the first number; the first factor is configurable, or the first factor is pre-defined.

In one embodiment, the first characteristic sum value in the present application is equal to a number of serving cell(s) comprised in the configuration cell group in the present application; the first sum value in the present application is equal to a number of serving cell(s) comprised in the scheduled cell set in the present application.

In one embodiment, the second sum value in the present application is equal to the first sum value in the present application, and the first characteristic sum value in the present application is not equal to the second characteristic sum value in the present application; a difference value between the second characteristic sum value and the first characteristic sum value is predefined, or a difference value between the second characteristic sum value and the first characteristic sum value is configurable.

In one embodiment, the first processor 1701 receives fourth information; herein, the fourth information is used to determine a second factor, the second factor is a positive number less than 1, the second factor is used to determine the second sum value in the present application, the second sum value in the present application is not equal to the first sum value in the present application, and the second characteristic sum value in the present application is equal to the first characteristic sum value in the present application.

In one embodiment, the fourth information in the present application is used to determine a first number of monitoring (s) and a sum number of monitoring(s), the first monitoring time(s) is equal to a number of monitoring(s) performed on a control signaling candidate used to schedule the characteristic cell in the present application in the target cell in the present application, and the sum number of monitoring(s) is equal to a total number of monitoring(s) performed on a control signaling candidate used to schedule the characteristic cell; the second factor in the present application is linearly correlated with a ratio of the first monitoring time(s) and the sum number of monitoring(s).

In one embodiment, the first SCS is one of X candidate SCSs, X being a positive integer greater than 1; the X candidate SCSs respectively correspond to X candidate parameters, and each of the X candidate parameters is a positive integer; a first parameter is a candidate parameter corresponding to the first SCS among the X candidate parameters, the first threshold value is equal to a target value rounded down to an integer, and the first parameter is used to determine the target value.

In one embodiment, the characteristic cell comprises a characteristic sub-band, the characteristic sub-band comprises at least one subcarrier, an SCS of any subcarrier comprised in the characteristic sub-band is equal to a second SCS, and the first SCS is not equal to the second SCS.

In one embodiment, the first processor 1701 transmits fifth information; herein, the fifth information is used to indicate a first capability parameter, and the first capability parameter is a positive integer; the first capability parameter is used to determine the first threshold value.

Embodiment 18

Figure 18:
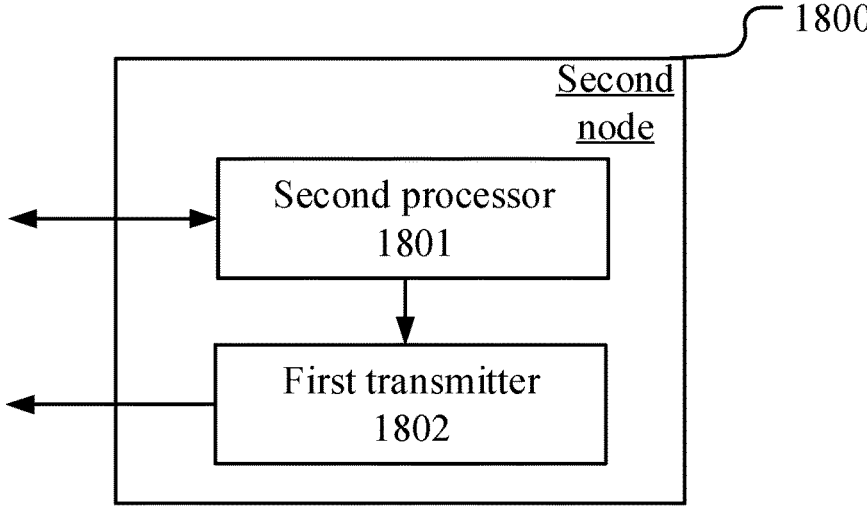
FIG. 18 illustrates a structure block diagram of a processing device in second node according to one embodiment of the present application.

Embodiment 18 illustrates the structure block diagram of a processing device in a second node, as shown in FIG. 18.

In FIG. 18, a processing device 1800 in a second node comprises a second processor 1801 and a first transmitter 1802. The second processor 1801 comprises the transmitter/receiver 416 (including the antenna 460), the receiving processor 412, the transmitting processor 415 and the controller/processor 440 in FIG. 4 of the present application; the first transmitter 1802 comprises the transmitter/receiver 416 (including the antenna 460), the transmitting processor 415 and the controller/processor 440 in FIG. 4 of the present application.

In embodiment 18, the second processor 1801 transmits first information, the first information is used to indicate a target cell, the target cell is used to schedule a characteristic cell, and the characteristic cell and the target cell belong to a same cell group; the first transmitter 1802 determines at least one control signaling candidate comprised in a target control signaling candidate set, the target control signaling candidate set comprises at least one control signaling candidate; herein, a first sub-band set comprises at least one sub-band, a first control signaling candidate is a control signaling candidate comprised in the target control signaling candidate set, and frequency-domain resources occupied by the first control signaling candidate belong to a sub-band comprised in the first sub-band set; a first time window comprises time-domain resources occupied by any control signaling candidate comprised in the target control signaling candidate set; a scheduling cell set comprises at least one serving cell, and a serving cell to which any sub-band comprised in the first sub-band set belongs belongs to the scheduling cell set; an SCS of a subcarrier comprised in any sub-band comprised in the first sub-band set is equal to a first SCS; the first SCS is used to determine a time length of the first time window; a number of monitoring(s) performed on at least one control signaling candidate comprised in the target control signaling candidate set is not greater than a first threshold value, and at least one of whether the scheduling cell set comprises the target cell or whether the characteristic cell is the same as the target cell is used to determine the first threshold value, the first threshold value is a non-negative integer.

In one embodiment, the second processor 1801 transmits second information; herein, the second information is used to indicate a configuration cell group, and the configuration cell group comprises multiple serving cells; the target cell belongs to the configuration cell group, the characteristic cell belongs to the configuration cell group, and the characteristic cell is a PCell in the configuration cell group; a scheduled cell set comprises a serving cell scheduled by a serving cell comprised in the scheduling cell set, and the scheduled cell set comprises at least one serving cell; any serving cell comprised in the scheduling cell set belongs to the configuration cell group, and any serving cell comprised in the scheduled cell set belongs to the configuration cell group.

In one embodiment, a target proportional value is used to determine the first threshold value, the target proportional value is a positive number not greater than 1, and the target proportional value is equal to one of a first proportional value or a second proportional value; the first proportional value is equal to a ratio of a first sum value and a first characteristic sum value, and the second proportional value is equal to a ratio of the second sum value and a second characteristic sum value; the first sum value is a positive number, the first characteristic sum value is a positive number not less than the first sum value, the second sum value is a positive number, the second characteristic sum value is a positive number not less than the second sum value, and the first proportional value and the second proportional value are not equal; at least one of whether the scheduling cell set comprises the target cell or whether the characteristic cell is the same as the target cell is used to determine the target proportional value between the first proportional value and the second proportional value.

In one embodiment, the second processor 1801 transmits third information; herein, the third information is used to indicate a first cell subset and a second cell subset, the first cell subset comprises at least one serving cell, and the second cell subset comprises at least one serving cell; a number of serving cell(s) belonging to the first cell subset comprised in the scheduled cell set in the present application is equal to a first number, and a number of serving cell(s) belonging to the second cell subset comprised in the scheduled cell set in the present application is equal to a second number; the first characteristic sum value in the present application is linearly correlated with a product of a number of serving cell(s) comprised in the second cell subset and a first factor, and the first characteristic sum value in the present application is linearly correlated with a number of serving cell(s) comprised in the first cell subset; the first sum value in the present application is linearly correlated with a product of the second number and the first factor, and the first sum value in the present application is linearly correlated with the first number; the first factor is configurable, or the first factor is pre-defined.

In one embodiment, the first characteristic sum value in the present application is equal to a number of serving cell(s) comprised in the configuration cell group in the present application; and the first sum value in the present application is equal to a number of serving cell(s) comprised in the scheduled cell set in the present application.

In one embodiment, the second sum value in the present application is equal to the first sum value in the present application, and the first characteristic sum value in the present application is not equal to the second characteristic sum value in the present application; a difference value between the second characteristic sum value in the present application and the first characteristic sum value is pre-defined, or a difference value between the second characteristic sum value in the present application and the first characteristic sum value in the present application is configurable.

In one embodiment, the second processor 1801 transmits fourth information; herein, the fourth information is used to indicate a second factor, the second factor is a positive number less than 1, the second factor is used to determine the second sum value in the present application, the second sum value in the present application is not equal to the first sum value in the present application, and the second characteristic sum value in the present application is equal to the first characteristic sum value in the present application.

In one embodiment, the fourth information in the present application is used to indicate a first number of monitoring(s) and a sum number of monitoring(s), the first number of monitoring(s) is equal to a number of monitoring(s) performed on at least one control signaling candidate used to schedule the characteristic cell in the present application in the target cell in the present application, and the sum number of monitoring(s) is equal to a total number of monitoring(s) performed on at least one control signaling candidate used to schedule the characteristic cell in the present application; the second factor is linearly correlated with a ratio of the first number of monitoring(s) and the sum number of monitoring(s).

In one embodiment, the first SCS is one of X candidate SCSs, X being a positive integer greater than 1; the X candidate SCSs respectively correspond to X candidate parameters, and each of the X candidate parameters is a positive integer; a first parameter is a candidate parameter corresponding to the first SCS among the X candidate parameters, the first threshold value is equal to a target value rounded down to an integer, and the first parameter is used to determine the target value.

In one embodiment, the characteristic cell comprises a characteristic sub-band, the characteristic sub-band comprises at least one subcarrier, an SCS of any subcarrier comprised in the characteristic sub-band is equal to a second SCS, and the first SCS is not equal to the second SCS.

In one embodiment, the second processor 1801 receives fifth information; herein, the fifth information is used to indicate a first capability parameter, and the first capability parameter is a positive integer; the first capability parameter is used to determine the first threshold value.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present application includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) configured for wireless communications, the UE comprising:
a receiver; and
a processor, wherein:
the receiver is configured to receive a first message, wherein the first message comprises information indicating a first cell and information indicating a second cell, wherein the first cell and the second cell belong to a same cell group; and
the receiver and the processor are configured to monitor at least one control signaling candidate comprised in a target control signaling candidate set, wherein a number of monitorings performed on the at least one control signaling candidate is not greater than a first threshold value, wherein the first threshold value is based on whether a scheduling cell set comprises the first cell.

2. The UE of claim 1, wherein the scheduling cell set comprises at least one serving cell, and a serving cell including any sub-band comprised in a first sub-band set belongs to the scheduling cell set, wherein the first sub-band set comprises at least one sub-band.

3. The UE of claim 2, wherein a first control signaling candidate is a control signaling candidate comprised in the target control signaling candidate set, and wherein frequency-domain resources occupied by the first control signaling candidate belong to a sub-band comprised in the first sub-band set.

4. The UE of claim 2, wherein a first time window comprises time-domain resources occupied by any control signaling candidate comprised in the target control signaling candidate set, and wherein a subcarrier spacing (SCS) of a subcarrier comprised in any sub-band comprised in the first sub-band set is equal to a first SCS.

5. The UE of claim 4, wherein the processor is further configured to determine a time length of the first time window based on the first SCS.

6. The UE of claim 1, wherein:
the receiver is further configured to receive a second message; and
the processor is further configured to determine a configuration cell group based on the second message, wherein the configuration cell group comprises multiple serving cells, wherein the first cell and the second cell belongs to the configuration cell group, and wherein the second cell is a primary cell (PCell) in the configuration cell group.

7. The UE of claim 1, wherein a target proportional value is used to determine the first threshold value, wherein the target proportional value is equal to one of a first proportional value or a second proportional value, wherein the first proportional value is equal to a ratio of a first sum value and a first characteristic sum value, and the second proportional value is equal to a ratio of a second sum value and a second characteristic sum value, and wherein whether the scheduling cell set comprises the first cell is used to determine the target proportional value between the first proportional value and the second proportional value.

8. The UE of claim 7, wherein when the second cell is the same as the first cell, the target proportional value is equal to the first proportional value, wherein when the second cell and the first cell are not the same and the scheduling cell set does not comprise the first cell, the target proportional value is equal to the first proportional value, and wherein when the second cell and the first cell are not the same and the scheduling cell set comprises the first cell, the target proportional value is equal to the second proportional value.

9. The UE of claim 8, wherein the second cell comprises a characteristic sub-band, wherein the characteristic subband comprises at least one subcarrier, and wherein an SCS of any subcarrier comprised in the characteristic sub-band is equal to a second SCS.

10. A method for use in a user equipment (UE) configured for wireless communications, the method comprising:
receiving a first message, wherein the first message comprises information indicating a first cell and information indicating a second cell, wherein the first cell and the second cell belong to a same cell group; and
monitoring at least one control signaling candidate comprised in a target control signaling candidate set, wherein a number of monitorings performed on the at least one control signaling candidate is not greater than a first threshold value, wherein the first threshold value is based on whether a scheduling cell set comprises the first cell.

11. The method of claim 10, wherein the scheduling cell set comprises at least one serving cell, and a serving cell including any sub-band comprised in a first sub-band set belongs to the scheduling cell set, wherein the first sub-band set comprises at least one sub-band.

12. The method of claim 11, wherein a first control signaling candidate is a control signaling candidate comprised in the target control signaling candidate set, and wherein frequency-domain resources occupied by the first control signaling candidate belong to a sub-band comprised in the first sub-band set.

13. The method of claim 11, wherein a first time window comprises time-domain resources occupied by any control signaling candidate comprised in the target control signaling candidate set, and wherein a subcarrier spacing (SCS) of a subcarrier comprised in any sub-band comprised in the first sub-band set is equal to a first SCS.

14. The method of claim 13, further comprising:
determining a time length of the first time window based on the first SCS.

15. The method of claim 10, further comprising:
receiving a second message; and
determining a configuration cell group based on the second message, wherein the configuration cell group comprises multiple serving cells, wherein the first cell and the second cell belongs to the configuration cell group, and wherein the second cell is a primary cell (PCell) in the configuration cell group.

16. The method of claim 10, wherein a target proportional value is used to determine the first threshold value, wherein the target proportional value is equal to one of a first proportional value or a second proportional value, wherein the first proportional value is equal to a ratio of a first sum value and a first characteristic sum value, and the second proportional value is equal to a ratio of a second sum value and a second characteristic sum value, and wherein whether the scheduling cell set comprises the first cell is used to determine the target proportional value between the first proportional value and the second proportional value.

17. The method of claim 16, wherein when the second cell is the same as the first cell, the target proportional value is equal to the first proportional value, wherein when the second cell and the first cell are not the same and the scheduling cell set does not comprise the first cell, the target proportional value is equal to the first proportional value, and wherein when the second cell and the first cell are not the same and the scheduling cell set comprises the first cell, the target proportional value is equal to the second proportional value.

18. The method of claim 17, wherein the second cell comprises a characteristic sub-band, wherein the characteristic subband comprises at least one subcarrier, and wherein an SCS of any subcarrier comprised in the characteristic sub-band is equal to a second SCS.

* * * * *